United States Patent
Porter

(10) Patent No.: US 7,457,687 B1
(45) Date of Patent: *Nov. 25, 2008

(54) IRRIGATION CONTROLLER WITH INDIRECTLY POWERED STATION MODULES

(75) Inventor: La Monte D. Porter, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/748,356

(22) Filed: May 14, 2007

Related U.S. Application Data

(63) Continuation-in-part of application No. 11/340,179, filed on Jan. 25, 2006, now Pat. No. 7,225,058.

(51) Int. Cl.
*G06F 19/00* (2006.01)
*A01G 5/16* (2006.01)

(52) U.S. Cl. ............... 700/284; 239/69; 137/624.11; 174/50; 174/53

(58) Field of Classification Search ............... 700/16, 700/282–284; 239/63, 69; 137/624.11; 174/50, 174/53
See application file for complete search history.

(56) References Cited

U.S. PATENT DOCUMENTS

| | | | |
|---|---|---|---|
| 5,262,936 A | 11/1993 | Faris et al. | 364/140 |
| 6,459,959 B1 | 10/2002 | Williams | 700/284 |
| 6,842,667 B2 | 1/2005 | Beutler et al. | 700/284 |
| 7,069,115 B1* | 6/2006 | Woytowitz | 700/284 |
| 2004/0225411 A1* | 11/2004 | Beutler et al. | 700/284 |
| 2005/0038529 A1* | 2/2005 | Perez et al. | 700/19 |
| 2005/0055106 A1* | 3/2005 | Beutler et al. | 700/11 |
| 2006/0030971 A1* | 2/2006 | Nelson et al. | 700/284 |

* cited by examiner

*Primary Examiner*—Albert DeCady
*Assistant Examiner*—Douglas S Lee
(74) *Attorney, Agent, or Firm*—Michael H. Jester

(57) ABSTRACT

An irrigation controller includes inputs for entry or selection of a watering program and a memory capable of storing the watering program. A plurality of station modules are removably received in a plurality of corresponding receptacles. Each station module includes a station module circuit for switching a source of electrical power to open and close at least one of a plurality of valves. When the station modules are inserted into the receptacles a communication path is established between each station module circuit and the processor. The processor is capable of executing the watering program and sending commands to the station module circuits to open and close the valves in accordance with the watering program. A manually actuable mechanism allows a power signal to be applied to each station module circuit after the station modules have been inserted into their corresponding receptacles and the communication path has been established.

20 Claims, 33 Drawing Sheets

IRRIGATION CONTROLLER WITH INDIRECTLY POWERED STATION MODULES

CROSS-REFERENCE TO RELATED APPLICATION

This application is a continuation-in-part of U.S. patent application Ser. No. 11/340,179 filed Jan. 25, 2006. That application is currently pending and has been allowed. The issue fee for U.S. patent application Ser. No. 11/340,179 was mailed to the USPTO on Apr. 12, 2007.

FIELD OF THE INVENTION

The present invention relates to electronic irrigation controllers that control valves which supply water to sprinklers, and more particularly, to modular irrigation controllers that can be configured on site to control more zones or stations.

BACKGROUND

Residential and commercial irrigation systems for turf and landscaping typically include one or more solenoid operated valves that are turned ON and OFF by an electronic irrigation controller. The valves admit water to various branch lines in the form of subterranean pipes that each supply several sprinklers connected at spaced intervals. Each combination of a solenoid valve and its associated sprinklers is referred to in the irrigation industry as a zone or station. A modern electronic irrigation controller typically includes a microprocessor that executes one or more stored watering programs. These watering programs are typically programmed or selected by the user via push button and/or rotary knob. The controller usually has a liquid crystal display (LCD) to facilitate programming by the user. The microprocessor controls the solenoid valves via suitable drivers and switching devices. The valves are opened and closed by the microprocessor in accordance with the programmed run and cycle times for each of the stations.

Modular expandable irrigation controllers have gained increasing popularity in both residential and commercial landscape applications. In a modular irrigation controller, the base portion of the irrigation controller contains the microprocessor and user actuated manual controls. Each station is then controlled by a corresponding station module which comprises a plastic housing that supports a station module circuit, as well as wire connection terminals for connecting wires that lead to a plurality of solenoid actuated irrigation valves. Typically each station module can independently control more than one solenoid actuated valve. The station modules contain pins, sockets, card edge connectors or some other standard form of electro-mechanical connectors for allowing them to be connected and disconnected from the base portion of the irrigation controller. The station modules are typically inserted into receptacles in either the housing that contains the microprocessor or a separate back panel connected to the microprocessor housing. A station module is typically connected to each solenoid actuated valve by a dedicated field valve line, for example, twelve gauge wire. A common return line is connected between all of the valves and the irrigation controller. Triacs in the station module circuit are typically used to switch a twenty-four volt AC power signal ON and OFF relative to each of the field valve lines.

The principal advantage of a modular expandable irrigation controller is that the base portion of the controller need only be equipped with the minimum number of station modules that can control the total number of stations required to irrigate the turf and/or landscaping of a particular system installation. Thus, for example, an irrigation system may have only three zones, requiring only a single station module, while another may have twelve zones which might require four station modules. Considerable cost savings are thus achieved and the distributor need not stock a wide size range of irrigation controllers. Moreover, if an irrigation system expands after initial installation because the landscaping has increased, additional station modules can be added. Furthermore, if a station module is damaged by a lightening strike, or otherwise fails, it can be replaced.

One drawback of conventional modular irrigation controllers is that the user typically connects the field vale lines to the station modules when the AC power to the modules is "live," presenting a risk of electric shock. If an indoor mounted controller is first disconnected from the AC wall outlet, there is a risk that the watering programs stored in the controller will be lost. Outdoor mounted controllers are usually hard-wired to an AC power source. To reduce the risk of electric shock, the user must first locate and turn off a circuit breaker, typically at a remote and inconvenient location, before connecting or re-connecting field valve line wires. Again, there is a risk of losing the watering programs when the power is shut off to the irrigation controller in this fashion.

Yet another problem with conventional modular controllers is that replacement of a damaged or defective station module requires disconnection and re-connection of the field valve lines to the station module. This is tedious, and often leads to mis-connection of the field valve lines when more than one station module is replaced at the same time.

SUMMARY

According to an embodiment of the present invention, an irrigation controller comprises a processor for executing a watering program and turning a plurality of irrigation valves ON and OFF in accordance with the watering program and at least one station module including a station module circuit connectable to at least one of the irrigation valves. The controller includes at least one receptacle that establishes a communication path between the processor and the station module circuit when the station module is inserted into the receptacle. A manually actuable mechanism allows a power connection to be applied to the station module circuit after the station module has been inserted into the receptacle and the communication path has been established.

BRIEF DESCRIPTION OF THE DRAWINGS

Throughout the drawing figures like reference numerals refer to like parts.

DETAILED DESCRIPTION

The entire disclosures of the following U.S. patents and applications are hereby incorporated by reference: U.S. Pat. No. 5,097,861 granted Mar. 24, 1992 of Hopkins et al. entitled IRRIGATION METHOD AND CONTROL SYSTEM; U.S. Pat. No. 5,444,611 granted Aug. 22, 1995 of Peter J. Woytowitz, et al. entitled LAWN AND GARDEN IRRIGATION CONTROLLER; U.S. Pat. No. 5,829,678 granted Nov. 3, 1998 of Richard E. Hunter et al. entitled SELF-CLEANING IRRIGATION REGULATOR VALVE APPARATUS; U.S. Pat. No. 6,088,621 granted Jul. 11, 2000 also of Peter J. Woytowitz et al. entitled PORTABLE APPARATUS FOR RAPID REPROGRAMMING OF IRRIGATION CONTROLLERS; U.S. Pat. No. 6,721,630 granted Apr. 13, 2004 also of Peter J. Woytowitz entitled EXPANDABLE IRRIGATION CONTROLLER WITH OPTIONAL HIGH-DENSITY STATION MODULE; U.S. Pat. No. 6,842,667 granted Jan. 11, 2005 of Beutler et al. entitled POSITIVE STATION MODULE LOCKING MECHANISM FOR EXPANDABLE IRRIGATION CONTROLLER; pending U.S. patent application Ser. No. 10/883,283 filed Jun. 30, 2004 also of Peter J. Woytowiz entitled HYBRID MODULAR/DECODER IRRIGATION CONTROLLER, now U.S. Pat. No. 7,069,115 granted Jun. 27, 2006; pending U.S. patent application Ser. No. 10/985,425 filed Nov. 9, 2004 also of Peter J. Woytowitz et al. and entitled EVAPOTRANSPIRATION UNIT CONNECTABLE TO IRRIGATION CONTROLLER; pending U.S. patent application Ser. No. 11/045,527 filed Jan. 28, 2005 also of Peter J. Woytowitz entitled DISTRIBUTED ARCHITECTURE IRRIGATION CONTROLLER; pending U.S. patent application Ser. No. 11/191,858 filed Jul. 28, 2005 also of Peter J. Woytowitz entitled MODULAR IRRIGATION CONTROLLER WITH SEPARATE FIELD VALVE LINE WIRING TERMINALS; pending U.S. patent application Ser. No. 11/251,690 filed Oct. 17, 2005 of Matthew G. Beutler et al. entitled MODULAR IRRIGATION CONTROLLER; pending U.S. patent application Ser. No. 11/288,831 filed Nov. 29, 2005 of LaMonte D. Porter et al. entitled EVAPOTRANSPIRATION UNIT FOR RE-PROGRAMMING AN IRRIGATION CONTROLLER; pending U.S. patent application Ser. No. 11/340,179 filed Jan. 25, 2006 of LaMonte D. Porter entitled MODULAR IRRIGATION CONTROLLER WITH INDIRECTLY POWERED STATION MODULES; and pending U.S. patent application Ser. No. 11/458,551 filed Jul. 19, 2006 of LaMonte D. Porter et al. entitled IRRIGATION CONTROLLER WITH INTERCHANGEABLE CONTROL PANEL. The aforementioned U.S. patents and applications are all assigned to Hunter Industries, Inc., the assignee of the subject application.

Figure 1:
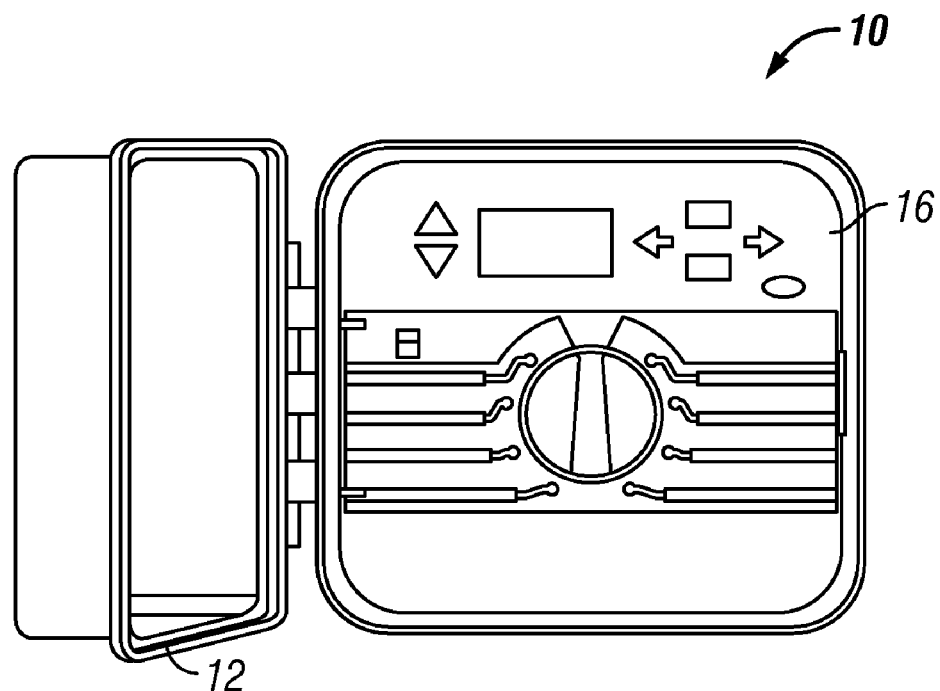
FIG. 1 is an isometric view of an irrigation controller in accordance with a first embodiment of the present invention with its front door open to reveal its removable face pack.
Figure 2:
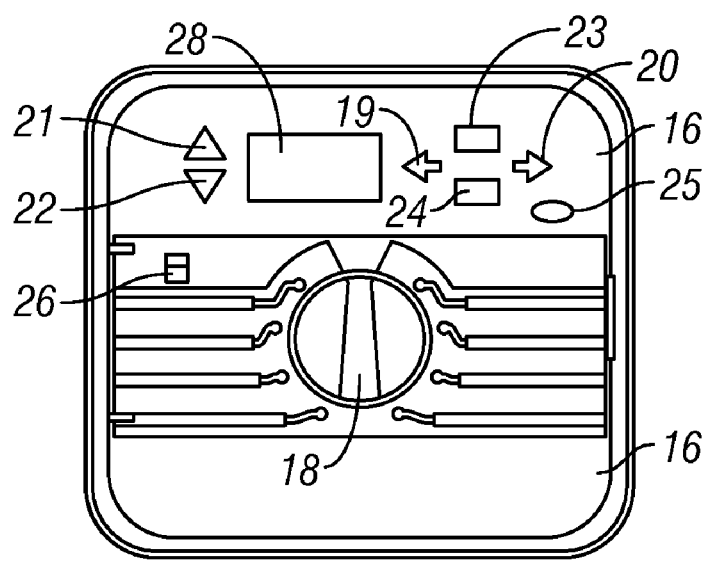
FIG. 2 illustrates the removable face pack of the irrigation controller of FIG. 1.
Figure 4:
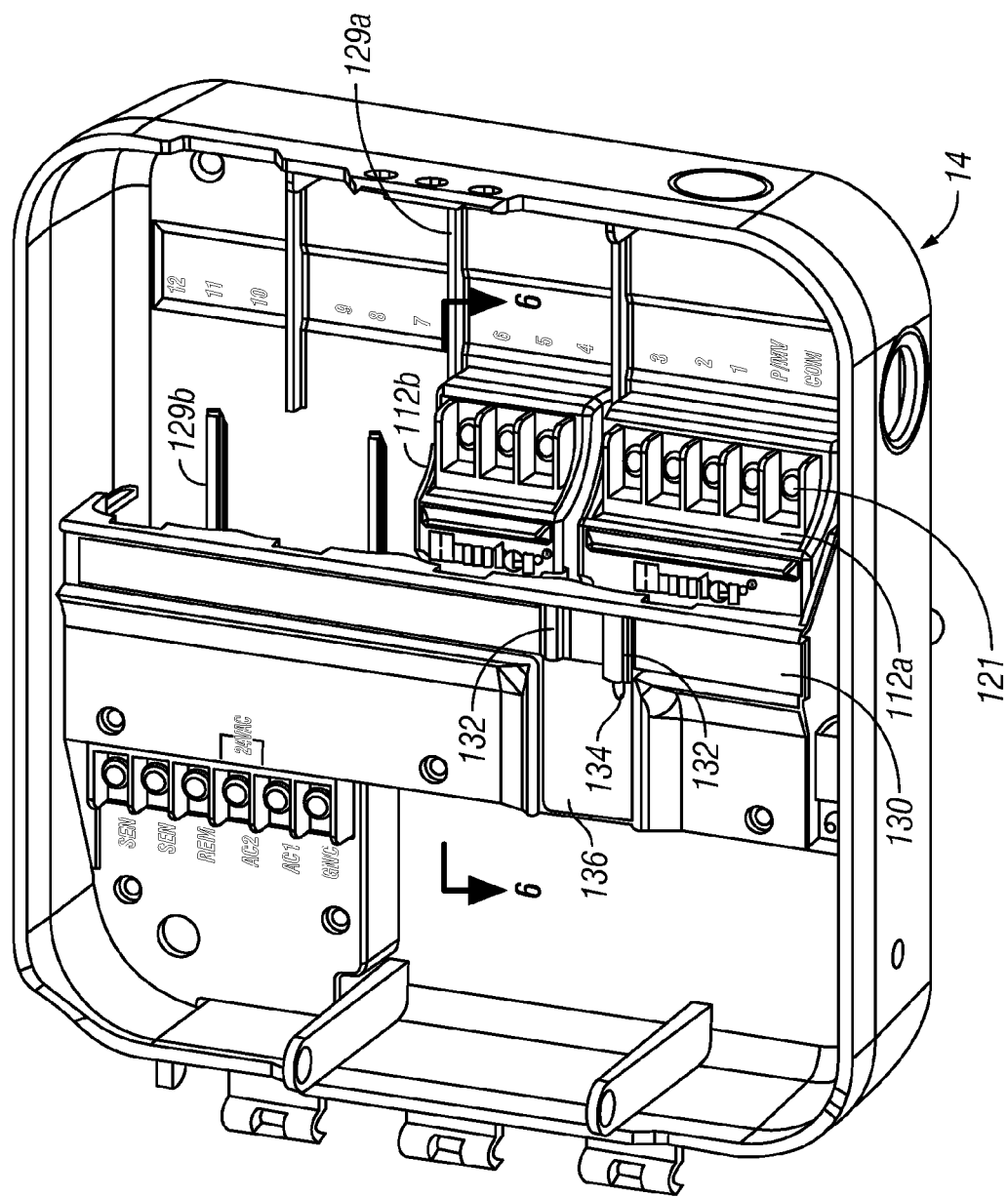
FIG. 4 is an enlarged isometric view of the back panel of the irrigation controller of FIG. 1 illustrating two station modules plugged into their respective receptacles.

Referring to FIGS. 1 and 2, an irrigation controller 10 in accordance with a first embodiment of the present invention represents an upgrade of the controller illustrated in FIGS. 4-9 of U.S. Pat. No. 6,842,667 of Beutler et al., which has been very successfully commercialized under the trademark Pro-C by Hunter Industries, Inc., the assignee of the present application. The irrigation controller 10 includes a wall-mountable plastic housing structure in the form of a generally box-shaped front door 12 hinged along one vertical edge to a generally box-shaped back panel 14 (FIG. 4). A generally rectangular face pack 16 (FIG. 2) is removably mounted over the back panel 14 and is normally concealed by the front door 12 when not being accessed for programming. The face pack 16 has a plurality of manually actuable controls including a rotary knob switch 18 and push button switches 19, 20, 21 22, 23, 24 and 25 as well as slide switch 26. These manual controls can be manipulated in conjunction with numbers, words and/or graphic symbols indicated on a liquid crystal display (LCD) 28 for entering or selecting a watering program as is well known in the art of electronic irrigation controllers. Custom watering programs can be created by the user by manipulating the rotary knob switch 18 and selected ones of the push button switches 19, 20, 21 22, 23, 24 and 25. The custom watering program can be a complex set of run time and cycle programs, or a portion thereof, such as a simple five minute cycle for a single station. Alternatively, existing pre-programmed watering programs can be selected, such as watering all zones every other day for five minutes per zone.

The face pack 16 (FIGS. 1 and 2) encloses and supports a PC board (not illustrated) with a processor for executing and implementing a stored watering program. An electrical connection is made between the face pack 16 and electrical components in the back panel 14 through a ribbon cable (not illustrated). The circuitry inside the face pack 16 can be powered by a battery to allow a person to remove the face pack 16, un-plug the ribbon cable, and walk around the lawn, garden or golf course while entering a watering program or altering a pre-existing watering program.

Figure 3:
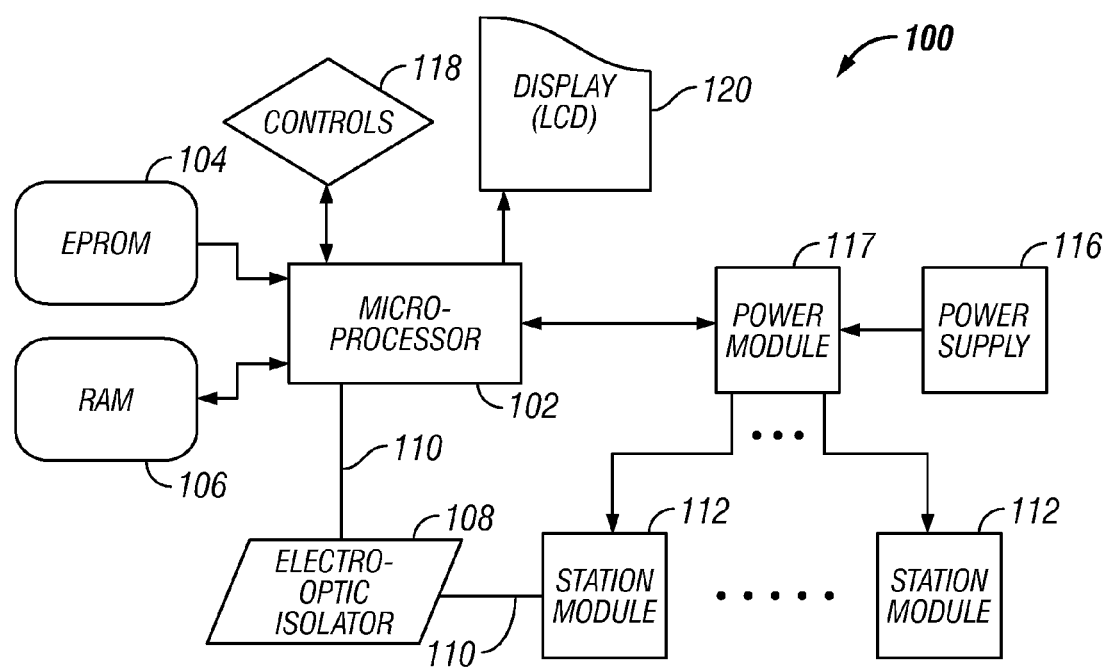
FIG. 3 is a simplified block diagram of the electronic portion of the irrigation controller of FIG. 1.

FIG. 3 is a simplified block diagram of the electronic portion of the irrigation controller 10. A processor, in the form of micro-processor 102 is mounted on the PC board inside the face pack 16. The micro-processor 102 executes a selected watering program stored in a program memory in the form of EPROM 104 using a data memory in the form of RAM 106. The processor 50 may comprise a micro-controller that uses separate memory, or a micro-computer with on-chip memory that serves the same functions as the EPROM 104 and RAM 106. The manually actuable controls 118 and the LCD display 28 of the controller 10 are interfaced with the processor micro-processor 102 in the usual fashion. The micro-processor 102 is connected through suitable input/output (I/O) devices (not illustrated), electro-optic isolators 108 and a bus 110 that is routed through the ribbon cable to a plurality of station modules 112. The station modules 112 are removably mounted in receptacles formed in the back panel 14. A power supply 116 located in the back panel 14 is connectable to a standard 110 volt AC source (not illustrated) and supplies electrical power to a power module 117. The power module 117 in turn supplies twenty-four volt AC power to the station modules 112 and five volt DC power to the micro-processor 102 through the ribbon cable.

The micro-processor 102 (FIG. 3) controls the station modules 112 and any master module in accordance with one or more watering programs. Serial or multiplexed communication is enabled over the bus 110 so that all of the information as to which stations or zones should be turned ON and OFF at any given time is present at each receptacle. Suitable synchronous serial data and asynchronous serial data station module circuits are disclosed in the aforementioned U.S. Pat. No. 6,721,630. The station modules 112 each include a small PC board which supports a station module circuit preferably including a micro-controller as well as multiple switching devices for switching the twenty-four volt AC power signal ON and OFF to different solenoid actuated valves (not illustrated). Typically the solenoid actuated valves are mounted in subterranean plastic boxes (not illustrated) relatively close to the controller 10. As used in the claims hereinafter, the term "irrigation valve" includes any type of remotely controlled valve useable in an irrigation system that may or may not employ a solenoid.

FIG. 4 illustrates two station modules 112a and 112b installed in side-by-side fashion in station module receptacles located in the back panel 14. The wider station module 112a is a base module that connects to three valves and also has terminals for connecting a pump relay wire and a pump relay common wire. The modules 112a and 112b have screw terminals 121 located at their rear ends for connecting the stripped ends of field valve lines typically comprising twelve gauge wires. Each station module, such as 112b (FIG. 5) comprises an outer generally rectangular plastic housing 122 with a slot 124 at its forward end. A small PC board 125 (FIG. 6) is mounted inside the station module housing 122 and supports the station module circuit. The station module circuit includes a micro-controller and triacs as well as conductive traces that lead to the screw terminals 121 and to a four generally V-shaped spring-type electrical contacts 126 (FIG. 5) accessible via the slot 124. The contacts 126 register with corresponding electrical contacts on the underside of a PC board 128 (FIGS. 6 and 7) mounted inside the back panel 14 when the module 112b is slid into its corresponding receptacle. The station modules 112a and 112b and the PC board 128 in the back panel 14 are thus electrically and mechanically connected in releasable fashion through a so-called "card edge" connection scheme when the station modules 112a and 112b are inserted or plugged into their respective receptacles.

The circuit on the PC board 128 (FIGS. 6 and 7) connects the station modules 112a and 112b to the processor 102 (FIG. 3) via the electro-optic isolators 108, bus 110 and ribbon cable. The receptacles of the irrigation controller 10 include upstanding vertical side walls 129a and center ridges 129b (FIG. 4) formed on a bay or receptacle region of the back panel 14. The side walls 129a and center ridges 129b support the station modules 112a and 112b and ensure that they mate with their respective card edge connectors in the preferred orientation within the back panel 14. The term "receptacle," as used in the claims hereafter, should be broadly construed as any structure, or region of a structure, which may or may not include electrical contacts and connectors, for removably receiving and supporting a plurality of individual station modules inside, or adjacent to, the remaining portion of an irrigation controller and establishing communication and/or a power connection with other electronic components of the irrigation controller.

A locking bar 130 (FIG. 4) can be manually slid up and down in FIG. 4 between unlocked and locked positions to simultaneously secure and un-secure the station modules 112a and 112b after they have been fully inserted into their respective receptacles. Opposing raised projections 132 formed on the locking bar 130 facilitate sliding the locking bar 130 with a thumb. A pointer 134 extends from one of the raised projections 132 and serves as a position indicator that aligns with UNLOCKED and LOCKED indicia (not illustrated) formed in or applied to the upper surface of a generally rectangular housing 136 mounted inside back panel 14.

Figure 5:
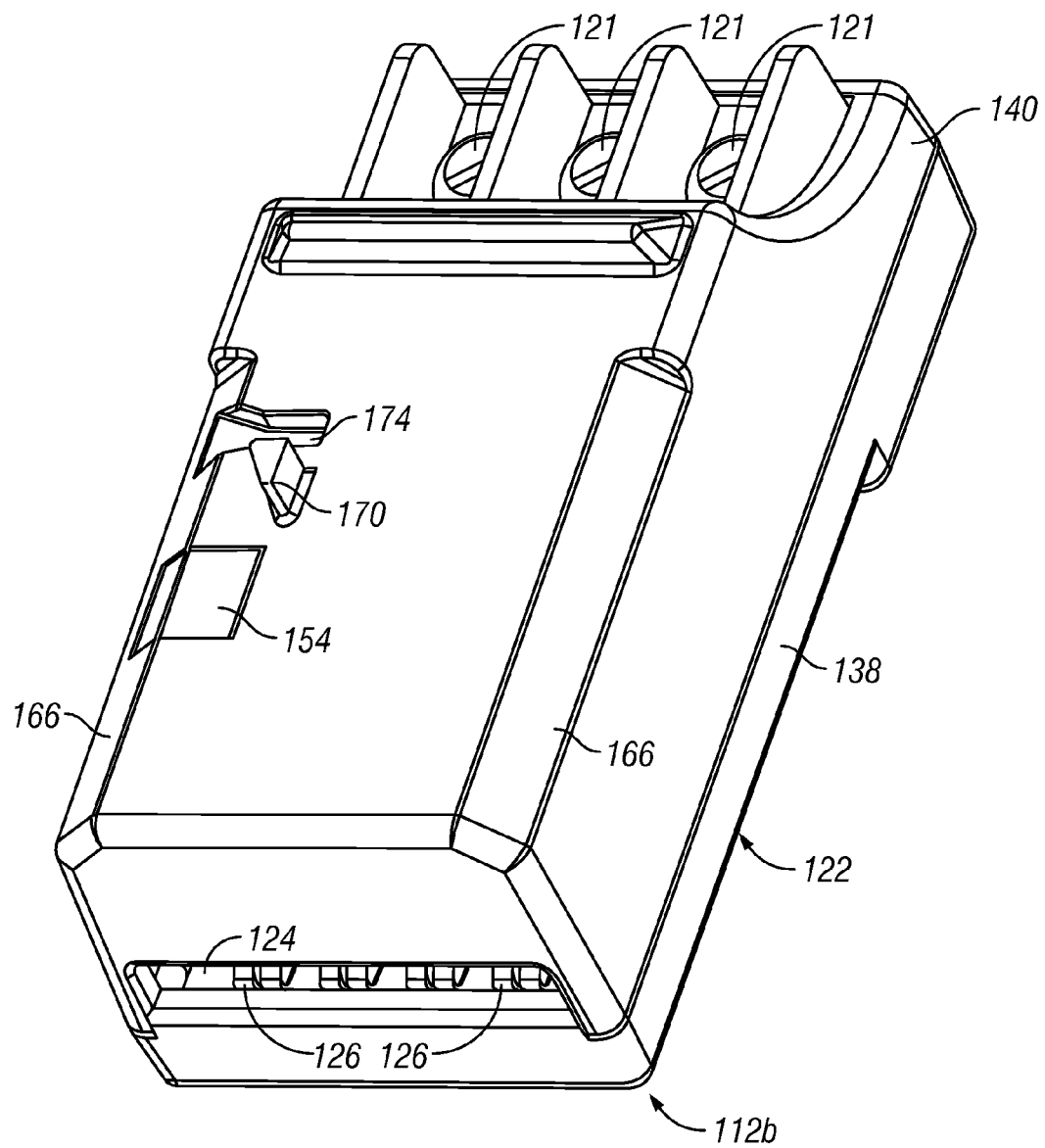
FIG. 5 is an enlarged isometric view of one of the station modules illustrated in FIG. 4.
Figure 6:
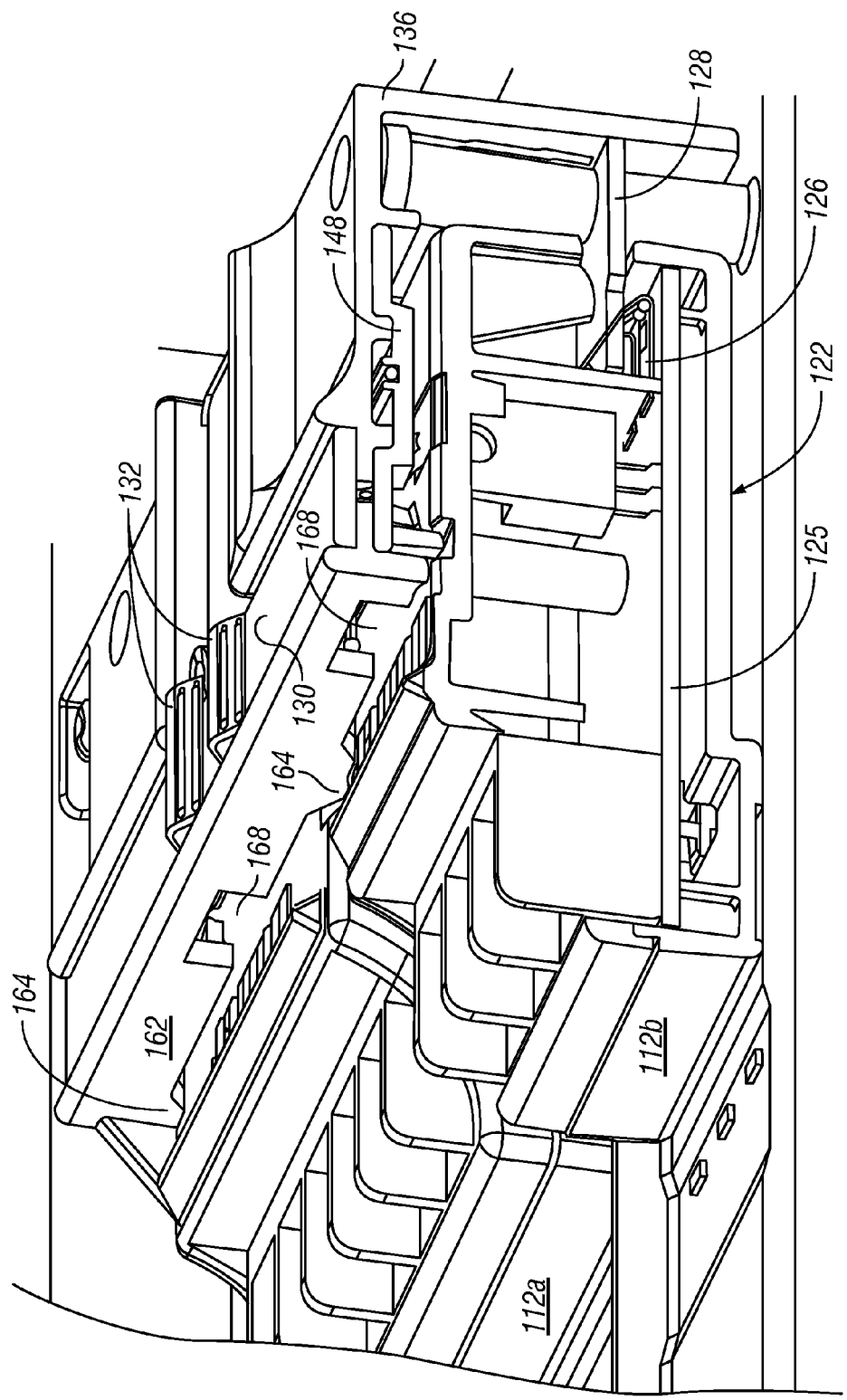
FIG. 6 is an enlarged sectional view taken along line 6-6 of FIG. 4, drawn in isometric fashion and illustrating further details of the irrigation controller of FIG. 1.

Referring to FIG. 5, each station module, such as 112b, includes a lower piece 138 that supports the PC board 125 (FIGS. 6 and 7) which in turn supports the screw terminals 121 and the contacts 126. An upper cover piece 140 (FIG. 5) fits over the lower piece 138 and is secured thereto by any suitable means such as screws, adhesive, sonic welding, or snap-in mechanisms (not illustrated). The station module 112b can be constructed so that the PC board 125 is supported by the upper cover piece 140, while the screw terminals 121 and contacts 126 are still supported by the lower piece 138. Conductive paths can then be established between the screw terminals 121, contacts 126 and the station module circuit via conductive pads and spring-like metal contacts (not illustrated) when the lower piece 138 and the upper cover piece 140 are mated and secured together with screws. This arrangement allows the cover piece 140 and its station circuit to be removed and replaced if damaged or defective, without having to remove the entire station module and re-wiring the field valve lines to the screw terminals 121.

Figure 7:
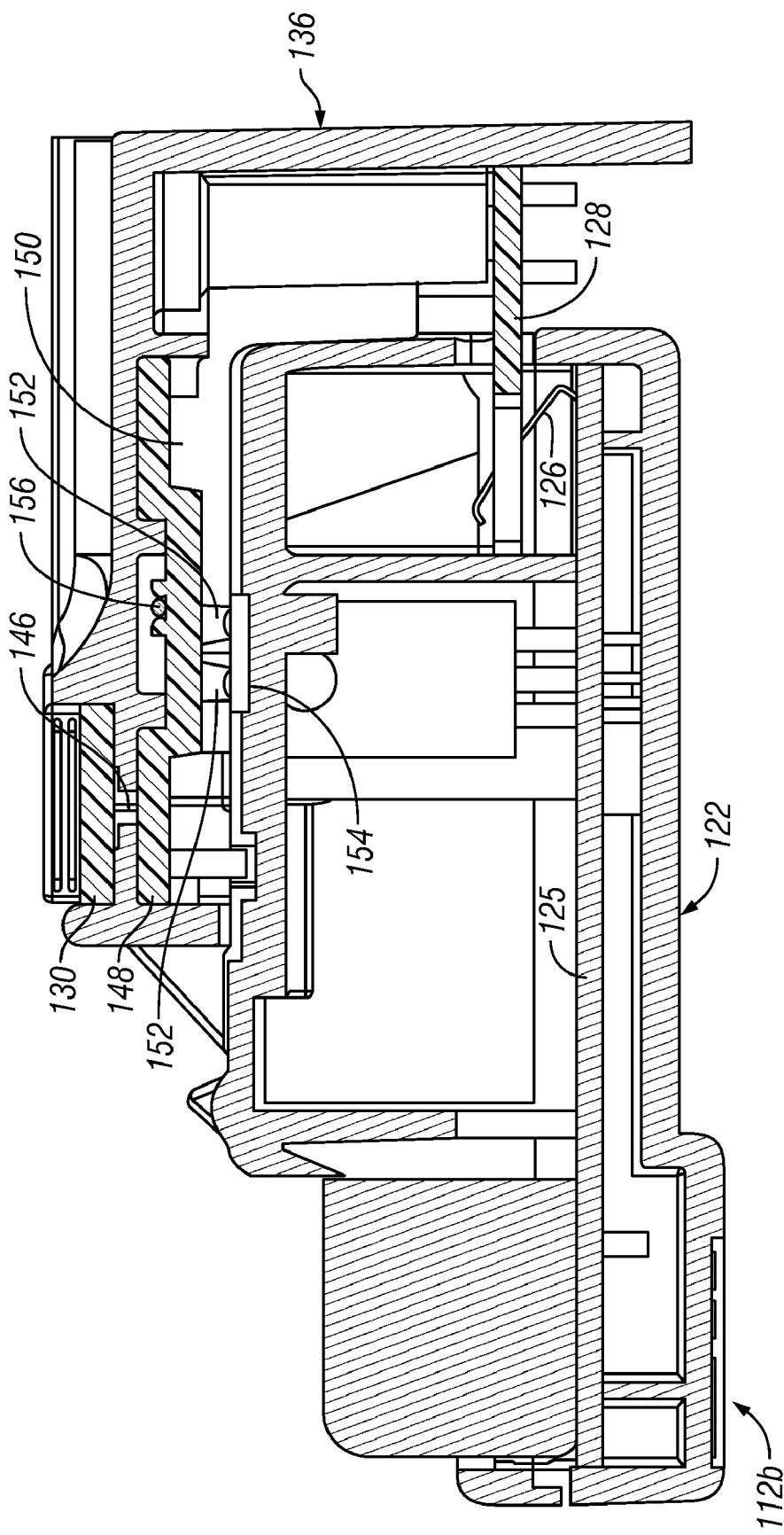
FIG. 7 is a sectional view similar to FIG. 6 drawn without any isometric aspect.
Figure 8:
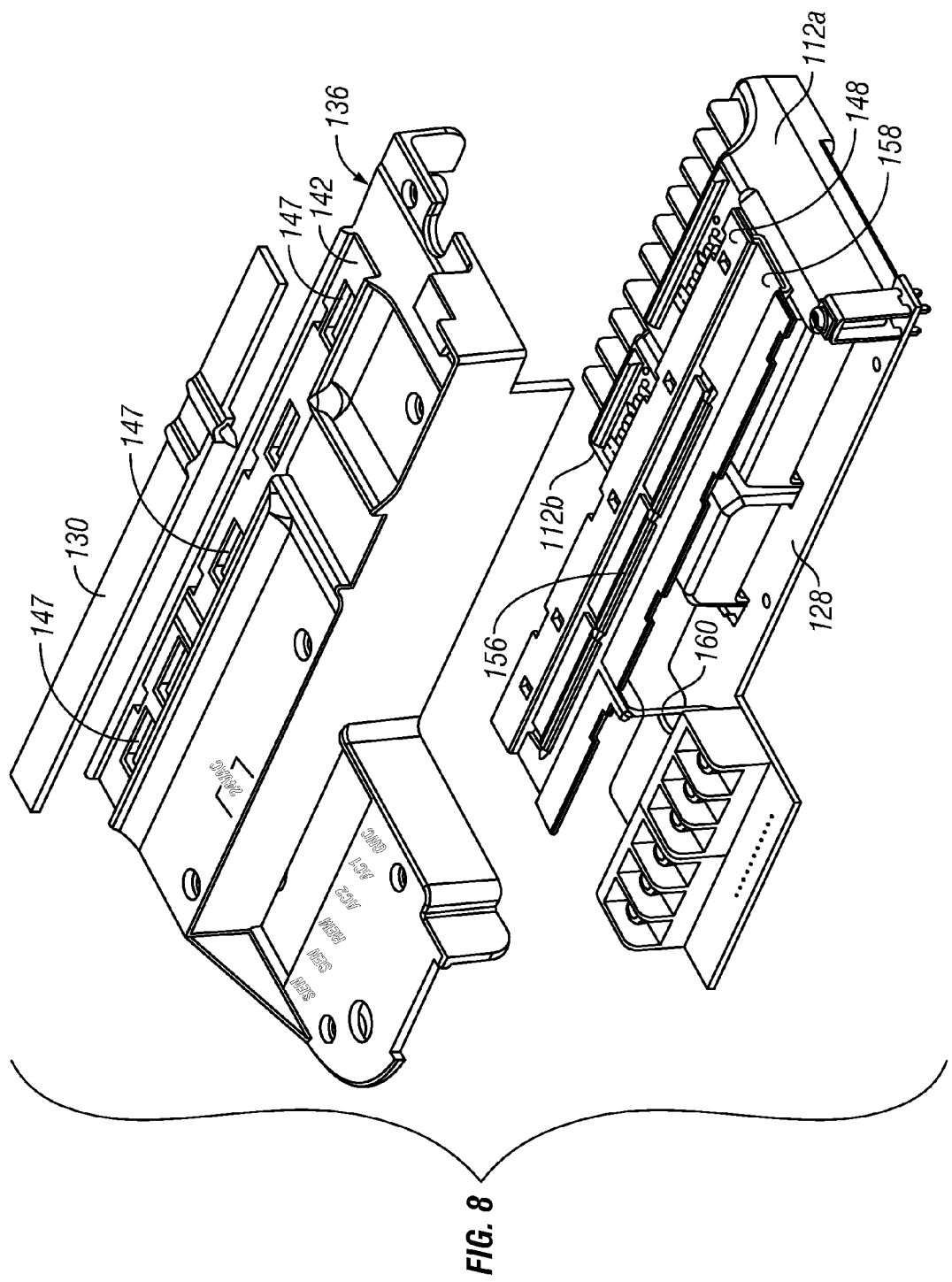
FIG. 8 is an exploded isometric view of portions of the structure mounted in the back panel of FIG. 4 that support the sliding locking bar.

Referring to FIG. 8, the locking bar 130 slides in a track 142 formed in the top of the housing 136. Vertical projections 146 (FIG. 7) extend through corresponding slots 147 (FIG. 8) in the track 142 and connect the locking bar 130 to a slide frame 148. Pairs of metal spring finger-like contacts 152 (FIG. 11) extend from the underside of the slide frame 148 at spaced intervals and can slide into, and out of, engagement with electrical contacts on the top surface of the station modules such as contact 154 (FIGS. 5 and 7) on the station module 112b. The contacts 154 are located on the top side of the station modules 112a and 112b, remote from the contacts 126 (FIG. 5) that engage the card edge connector contacts on the PC board 128. Each contact 154 is electrically connected through a wire or other conductor (not illustrated) to the station module circuit on the corresponding PC board 125. A rigid conductor 156 (FIG. 8) is confined in a trough formed in a template 158 supported by the slide frame 148 and connects to each of the pairs of contacts 152. The conductor 156 is connected through a suitably flexible wire 160 to the PC board 128 for providing twenty-four volt AC power to each of the station modules 12 plugged into receptacles in the back panel 14.

Figure 9:
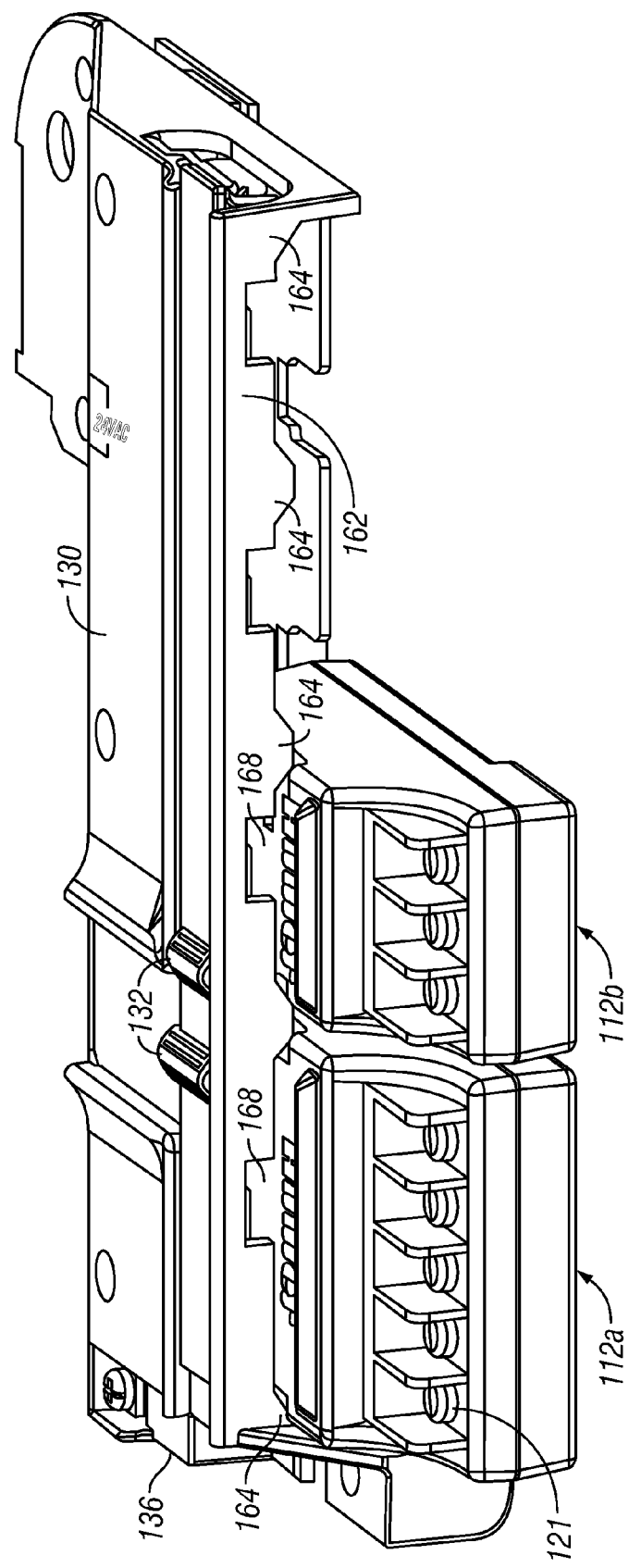
FIG. 9 is an isometric view of the components illustrated in FIG. 8 once assembled and illustrating the sliding locking bar in its unlocked position.

FIG. 9 illustrates the station modules 112a and 112b inserted into their respective receptacles and the locking bar 130 in its unlocked and unpowered position. The housing 136 has a downwardly extending front wall 162 with a plurality of generally triangular projections such as 164. The projections 164 fit between the chamferred top side edges 166 (FIG. 5) of the station modules such as station module 112b. This prevents the insertion of incompatible older generation station modules (not illustrated) that have square top side edges.

Rectangular recesses 168 (FIG. 11) in the front wall 162 provide clearance for projections such as 170 (FIG. 5) that extend upwardly from the top surface of each station module such as 112b. The projections 170 allow the modules 112a and 112b to be backwardly compatible with an older generation of the irrigation controller in which they are used to enable a slide lock to secure the modules in their respective receptacles. The housing 136, front wall 162 and projections 164 form part of the receptacles that receive and hold the station modules 112a and 112b in place in the back panel 14.

Vertical tabs 172 (FIGS. 11 and 12) extend downwardly from the front edge of the slide frame 148. The beveled leading edges of the vertical tabs 172 facilitate their penetration into laterally extending flared grooves 174 (FIG. 5) formed in the top side of the station modules such as 112b. This secures the station modules 112a and 112b in place in the back panel 14 and prevents them from being withdrawn from their receptacles when the spring finger-like contacts 152 are engaged with their respective top side contacts 154.

Figure 11:
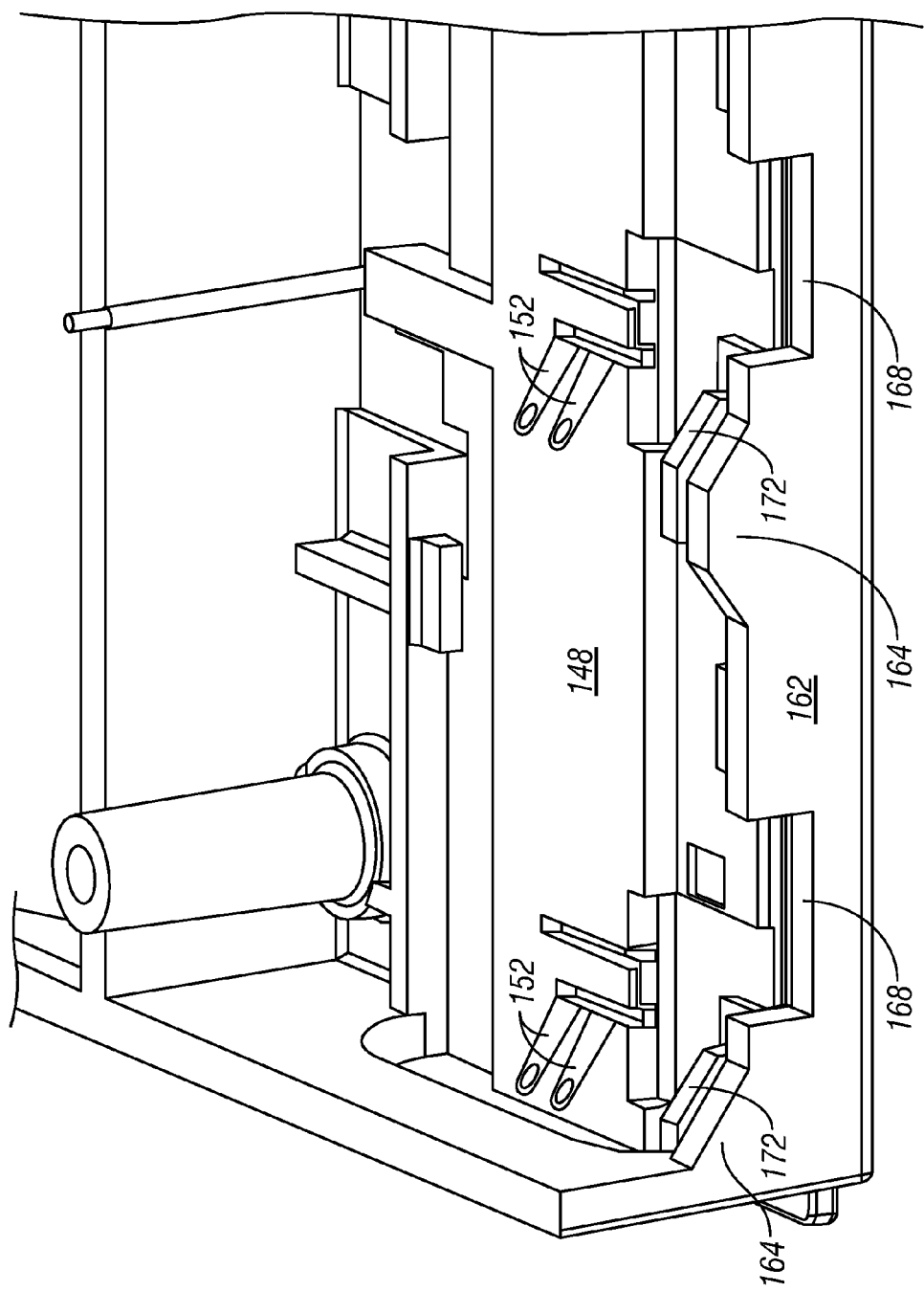
FIG. 11 is a still further enlarged fragmentary isometric view illustrating the underside of the assembled components of FIG. 9 when the sliding locking bar is in its unlocked position.

FIG. 11 illustrates the position of the slide frame 148 when the locking bar 130 is in its unlocked and unpowered position. In this configuration the finger-like contacts 152 are located to the left and the tabs 172 are withdrawn behind the adjacent projections 164 of the front wall 162 of the upper housing 144. The receptacles are thus clear and this allows the station modules 112a and 112b to be freely inserted and withdrawn from the same. Once the station modules 112a and 112b are inserted, the V-shaped spring-type electrical contacts 126 (FIG. 5) of the station modules 112a and 112b engage corresponding contacts on the PC board 128 to establish a communication path between the station modules 112a and 112b and the micro-processor 102. However at this time no AC power has been supplied to the station modules 112a and 112b so the user is free to connect field valve lines to the screw terminals 121 without the risk of electric shock.

Figure 10:
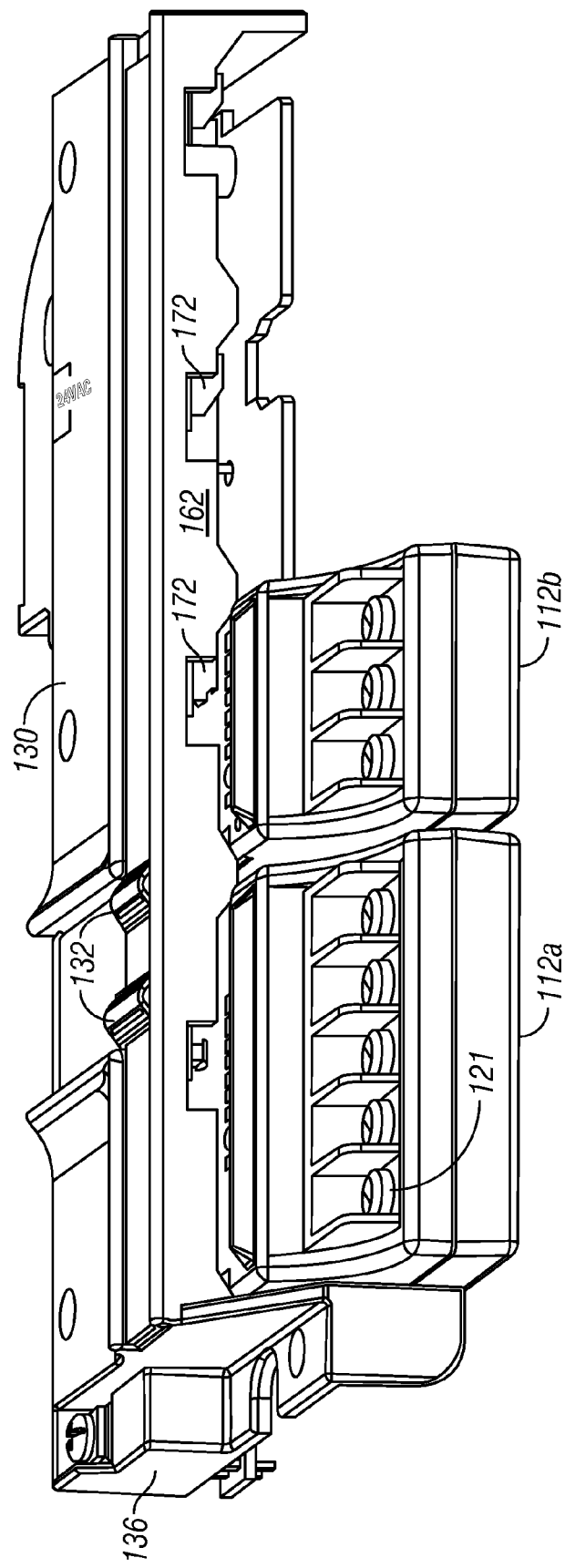
FIG. 10 is an isometric view similar to FIG. 9 taken from a different angle and illustrating the sliding locking bar in its locked position.
Figure 12:
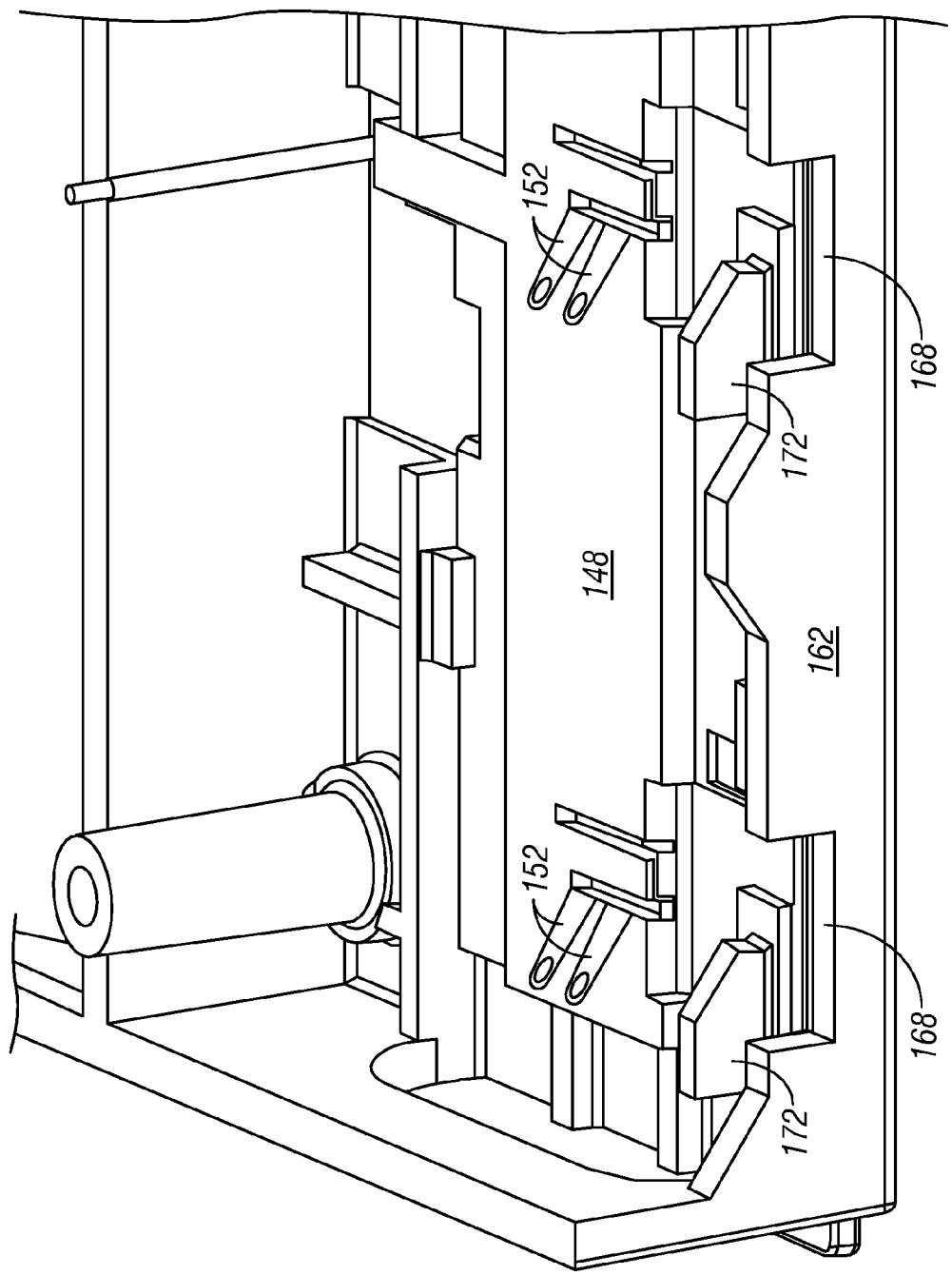
FIG. 12 is a view similar to FIG. 11 illustrating the sliding locking bar in its locked position.
Figure 13:
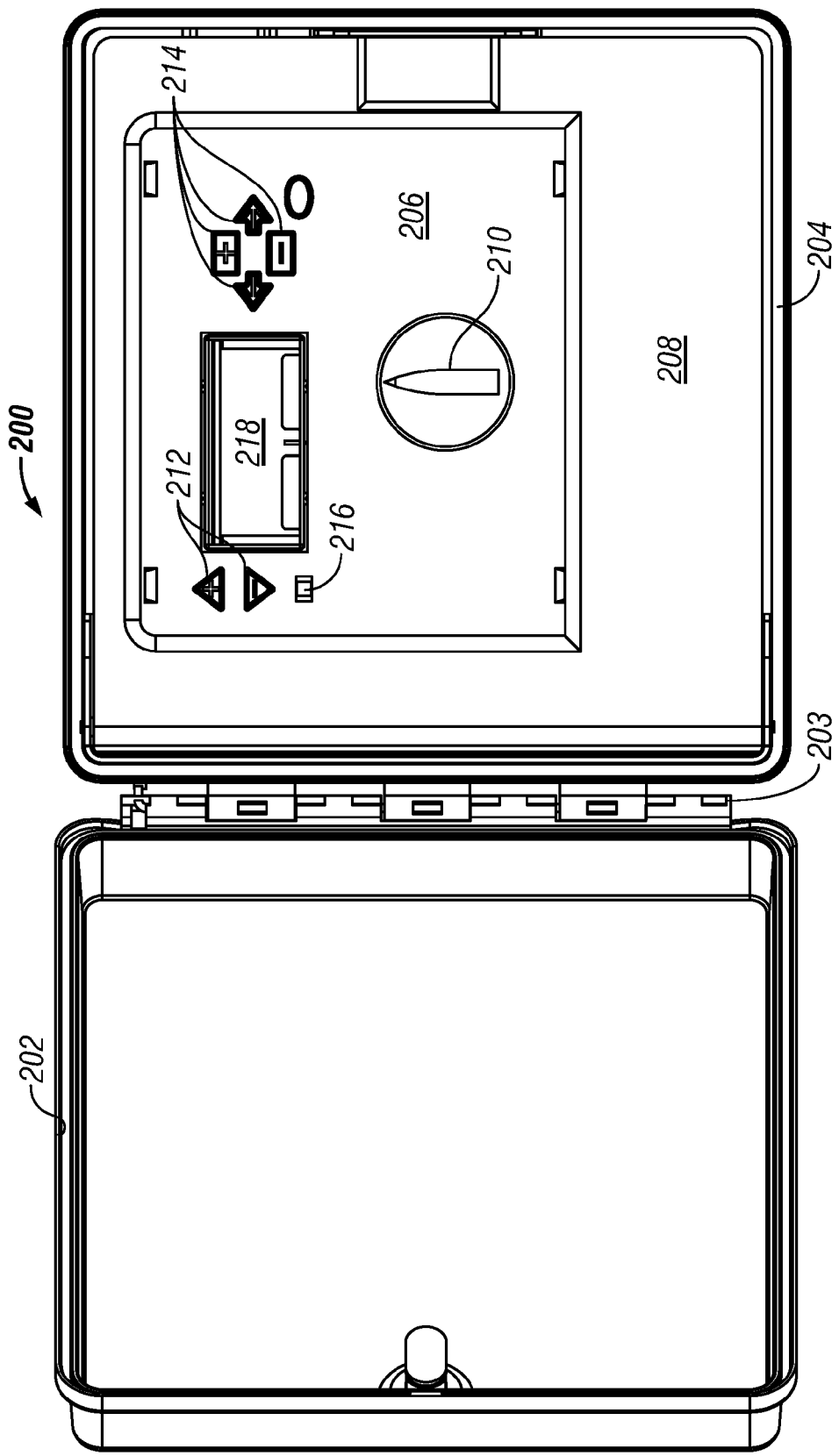
FIG. 13 is a front elevation view of an irrigation controller in accordance with a second embodiment of the present invention with its front door open to reveal its removable face pack.

When the locking bar 130 is slid downwardly to its locked and powered position, illustrated in FIG. 4, the slide frame 148 will move to the position illustrated in FIG. 12. The tabs 172 then partially block the entrances to their respective empty receptacles to prevent inadvertent insertion of station modules 112a and 112b at a time when the contacts 152 would be damaged. The station modules 112a and 112b are not illustrated in FIG. 11 so that the locations of the finger-like contacts 152 and tabs 172 can be seen. FIG. 10 illustrates the station modules 112a and 112b inserted into their respective receptacles and the locking bar 130 in its locked and powered position. When the locking bar 130 is moved to its locked and powered position, the tabs 172 slide into the grooves 174 of the station modules 112a and 112b if they have been fully inserted into their respective receptacles. This secures the station modules 112a and 112b in the back panel 14. When the locking bar 130 is slid to its locked position, the contacts 152 slide over the station module top side contacts 154 as best seen in FIG. 7.

Figure 14:
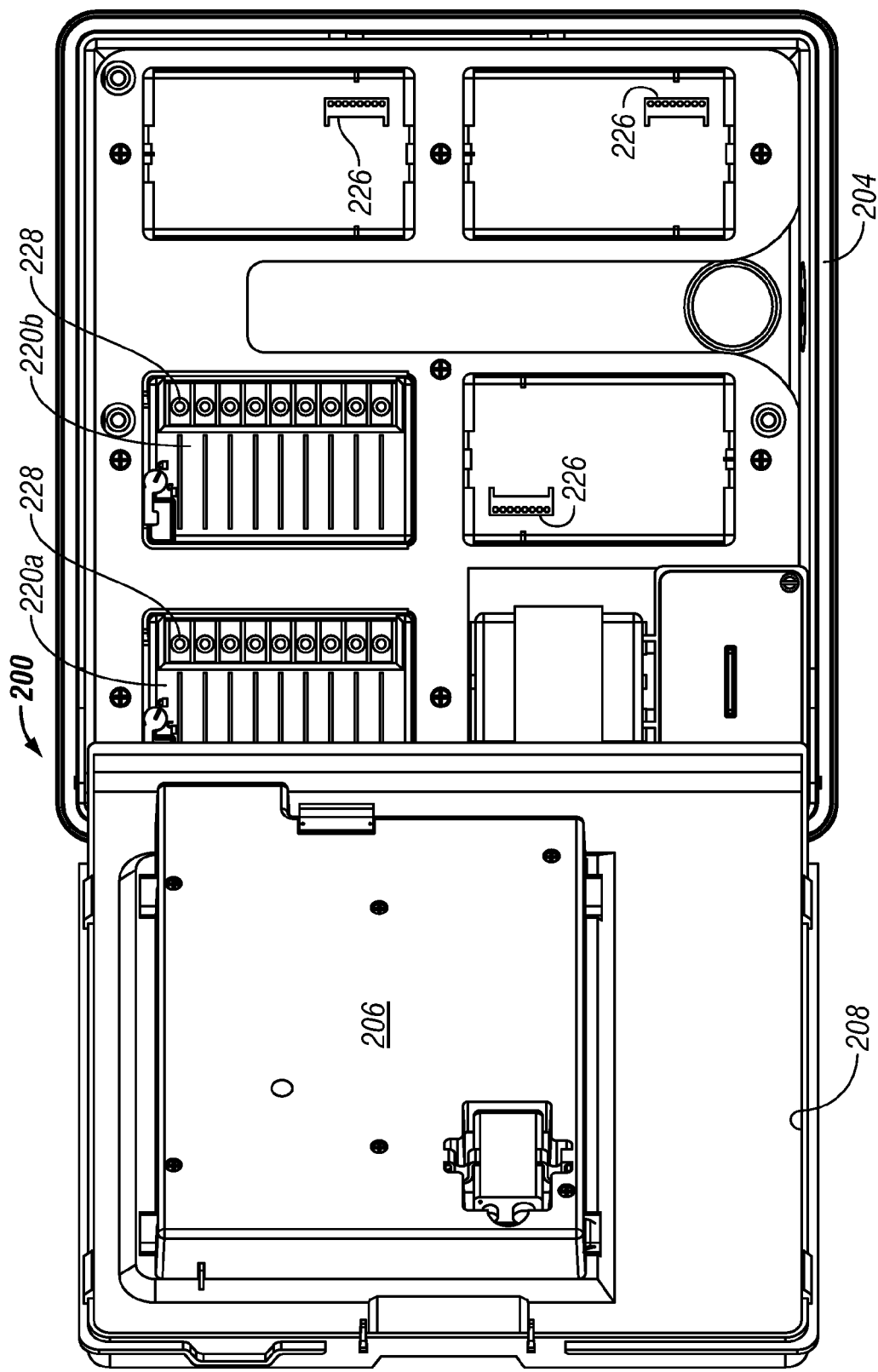
FIG. 14 is a front elevation view of the irrigation controller of FIG. 13 with its face pack carrying frame swung open to reveal the module-receiving receptacles in its back panel.

FIGS. 13-24 illustrate a second embodiment 200 of the modular irrigation controller of the present invention which represents an upgrade of the modular irrigation controller of FIGS. 1-3 of U.S. Pat. No. 6,842,667 of Beutler et al., which has been very successfully commercialized under the trademark ICC by Hunter Industries, Inc., the assignee of the present application. The irrigation controller 200 includes a wall-mountable plastic housing structure in the form of a generally box-shaped front door 202 (FIG. 13) connected via hinge assembly 203 along one vertical edge to a generally box-shaped back panel 204 (FIG. 14). A generally rectangular face pack 206 (FIG. 13) is removably mounted in a rectangular frame 208. The frame 208 is also connected to the back panel 204 for independent swinging motion between the door 202 and the back panel 204. The face pack 206 is normally concealed by the front door 202 when not being accessed for programming. The face pack 206 has a plurality of manually actuable controls including a rotary knob switch 210 and push button switches 212 and 214 as well as slide switch 216. These manual controls can be manipulated in conjunction with numbers, words and/or graphic symbols indicated on a liquid crystal display (LCD) 218 for entering or selecting a watering program as is well known in the art of electronic irrigation controllers.

The face pack 206 (FIG. 13) encloses and supports a PC board (not illustrated) with a processor for executing and implementing a watering program stored in a memory. An electrical connection is made between the face pack 206 and electrical components in the back panel 204 through a ribbon cable (not illustrated). The circuitry inside the face pack 206 can be powered by a battery to allow a person to remove the face pack 206, un-plug the ribbon cable, and walk around the lawn, garden or golf course while entering a watering program or altering a pre-existing watering program.

Figure 15:
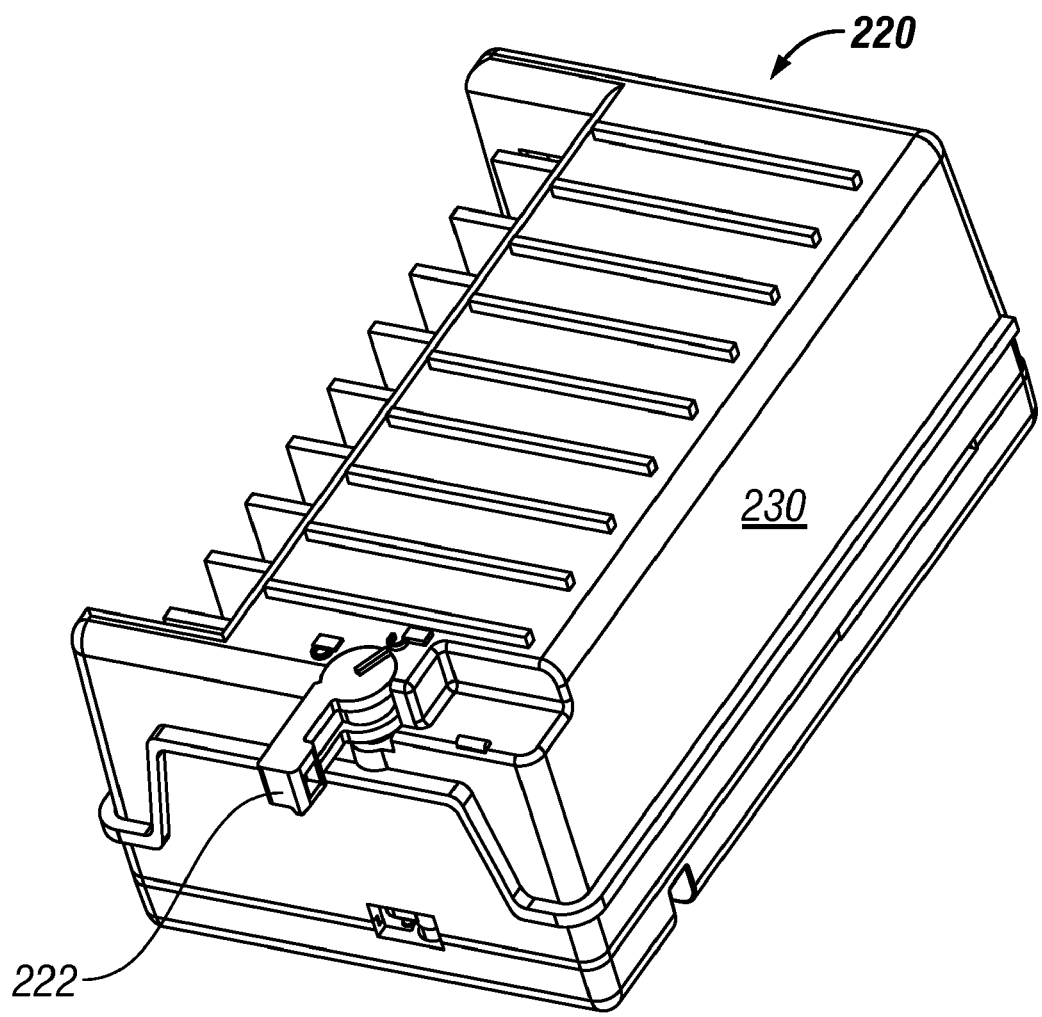
FIG. 15 is an enlarged isometric view of one of the station modules of the second embodiment with its locking latch in its unlocked (power OFF) position.
Figure 16:
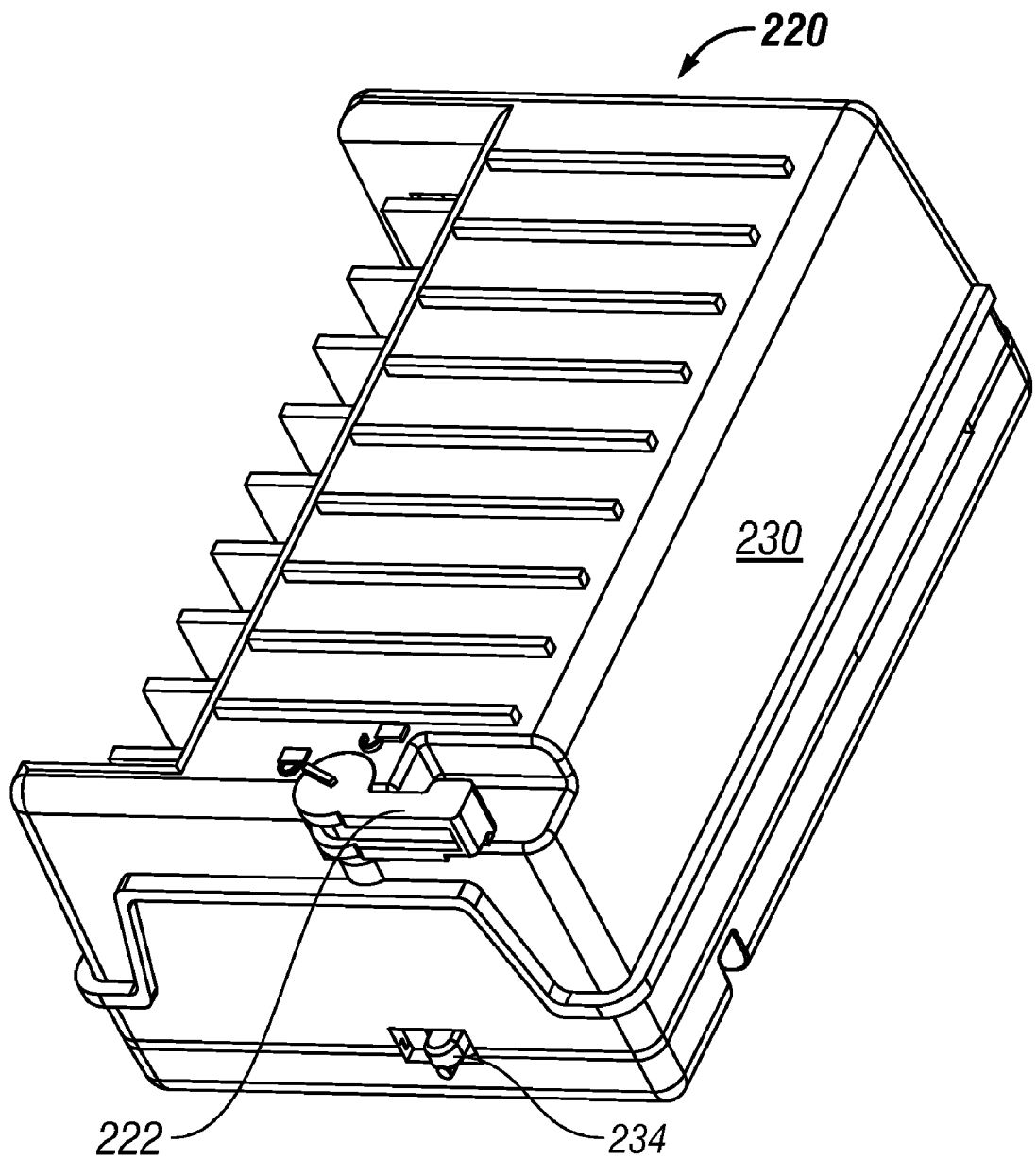
FIG. 16 is an enlarged isometric view of one of the station modules of the second embodiment with its locking latch in its locked (power ON) position.
Figure 17:
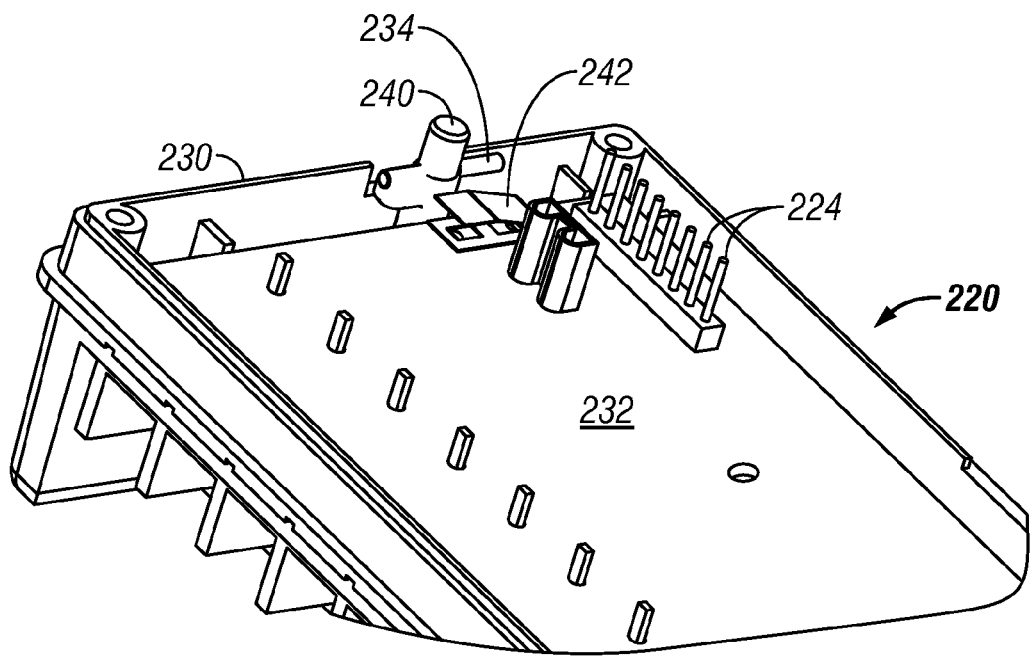
FIG. 17 is an enlarged, fragmentary isometric view of the bottom of one of the station modules of the second embodiment with its locking latch in its unlocked (power OFF) position.
Figure 18:
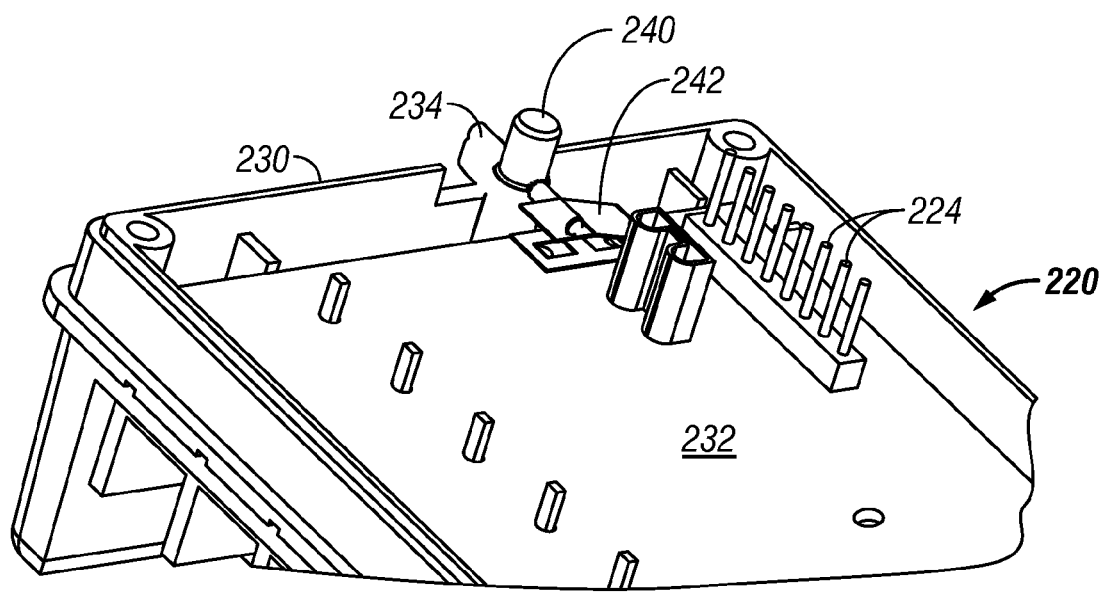
FIG. 18 is an enlarged, fragmentary isometric view of the bottom of one of the station modules of the second embodiment with its locking latch in its locked (power ON) position.
Figure 19:
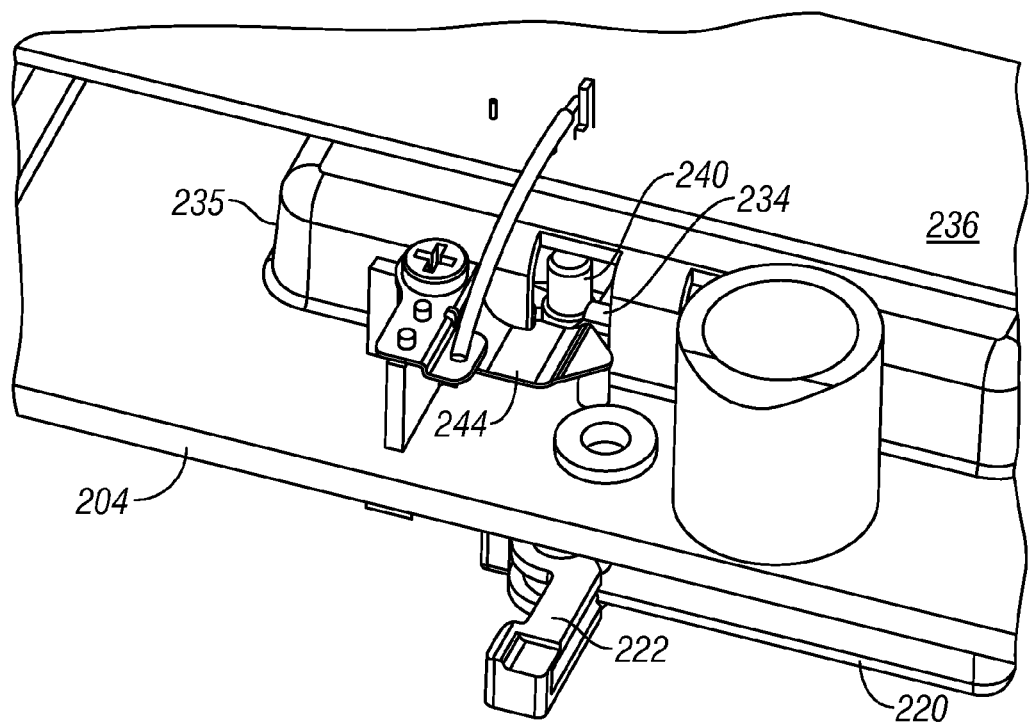
FIG. 19 is an enlarged fragmentary isometric view illustrating the location of the power pin of a station module which has been plugged into a receptacle of the second embodiment with its power pin in its unlocked (power OFF) position.
Figure 20:
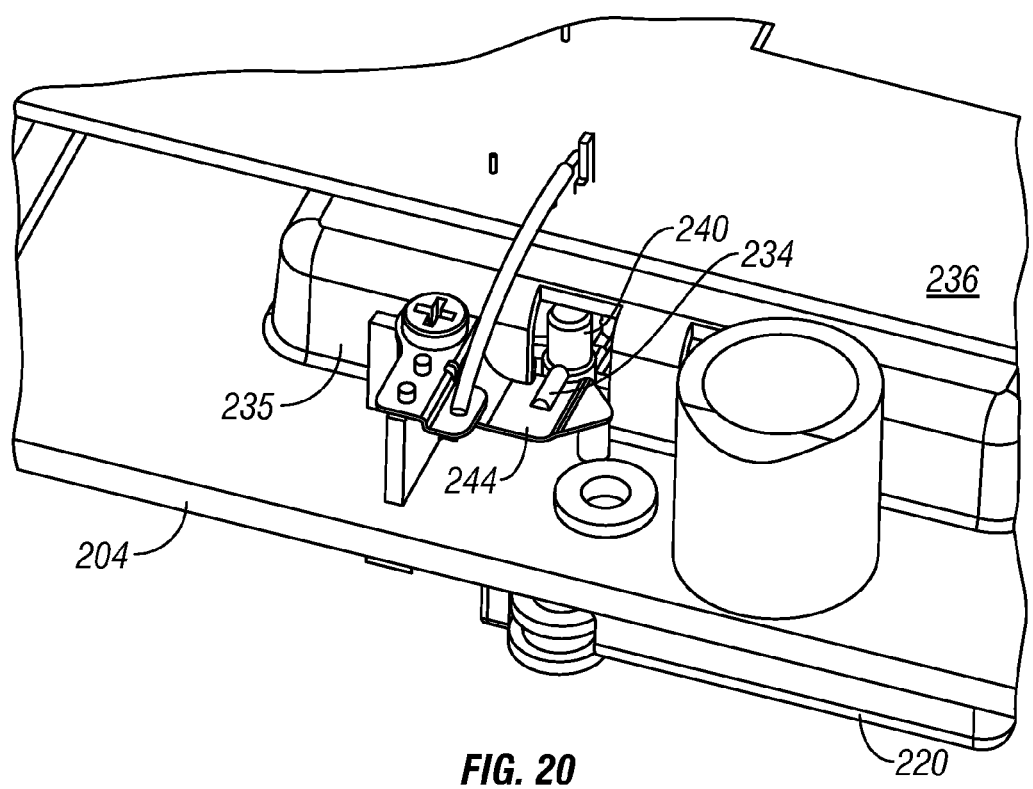
FIG. 20 is a view similar to FIG. 19 with the power pin in its locked (power ON) position.
Figure 21:
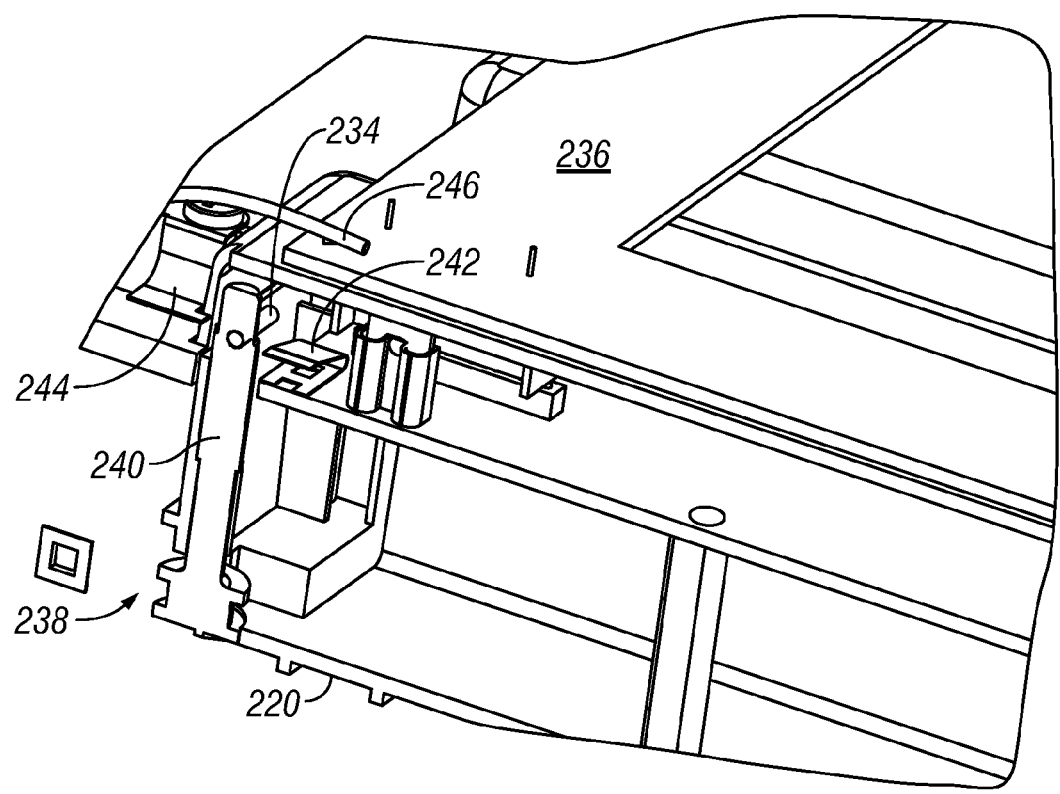
FIG. 21 is a fragmentary isometric vertical sectional view of a portion of the second embodiment illustrating a station module plugged into a receptacle and the locking latch and power pin in their unlocked (power OFF) positions.
Figure 22:
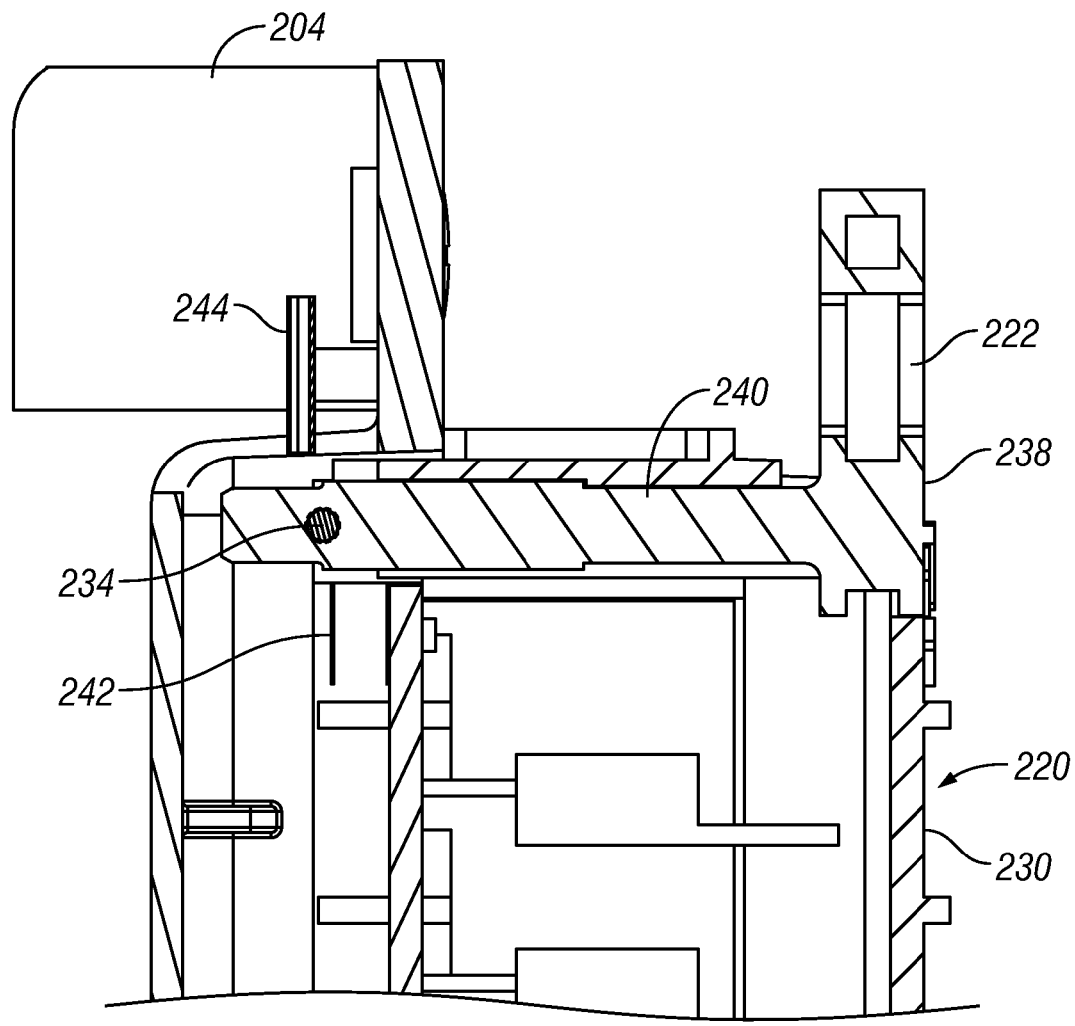
FIG. 22 is an enlarged, non-isometric vertical sectional view of a portion of the second embodiment illustrating a station module plugged into a receptacle and the locking latch and power pin in their unlocked (power OFF) positions.
Figure 23:
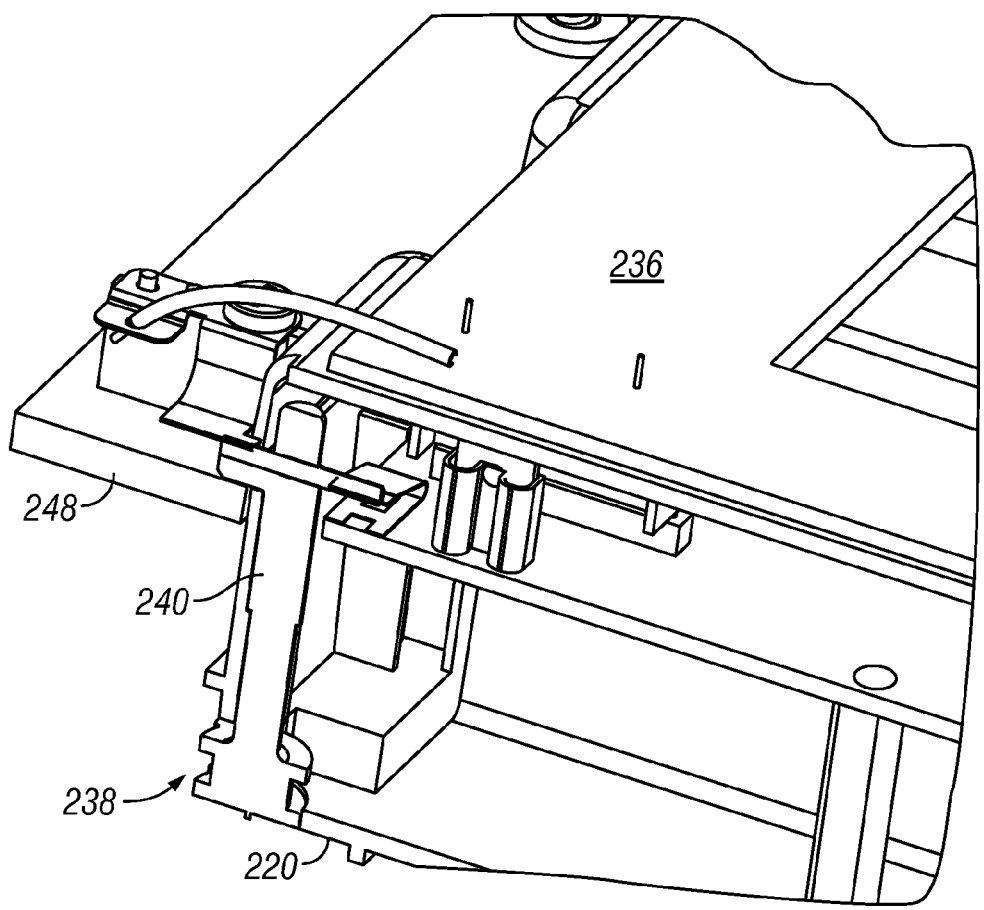
FIG. 23 is a view similar to FIG. 21 with the locking latch and power pin in their locked (power ON) positions.
Figure 24:
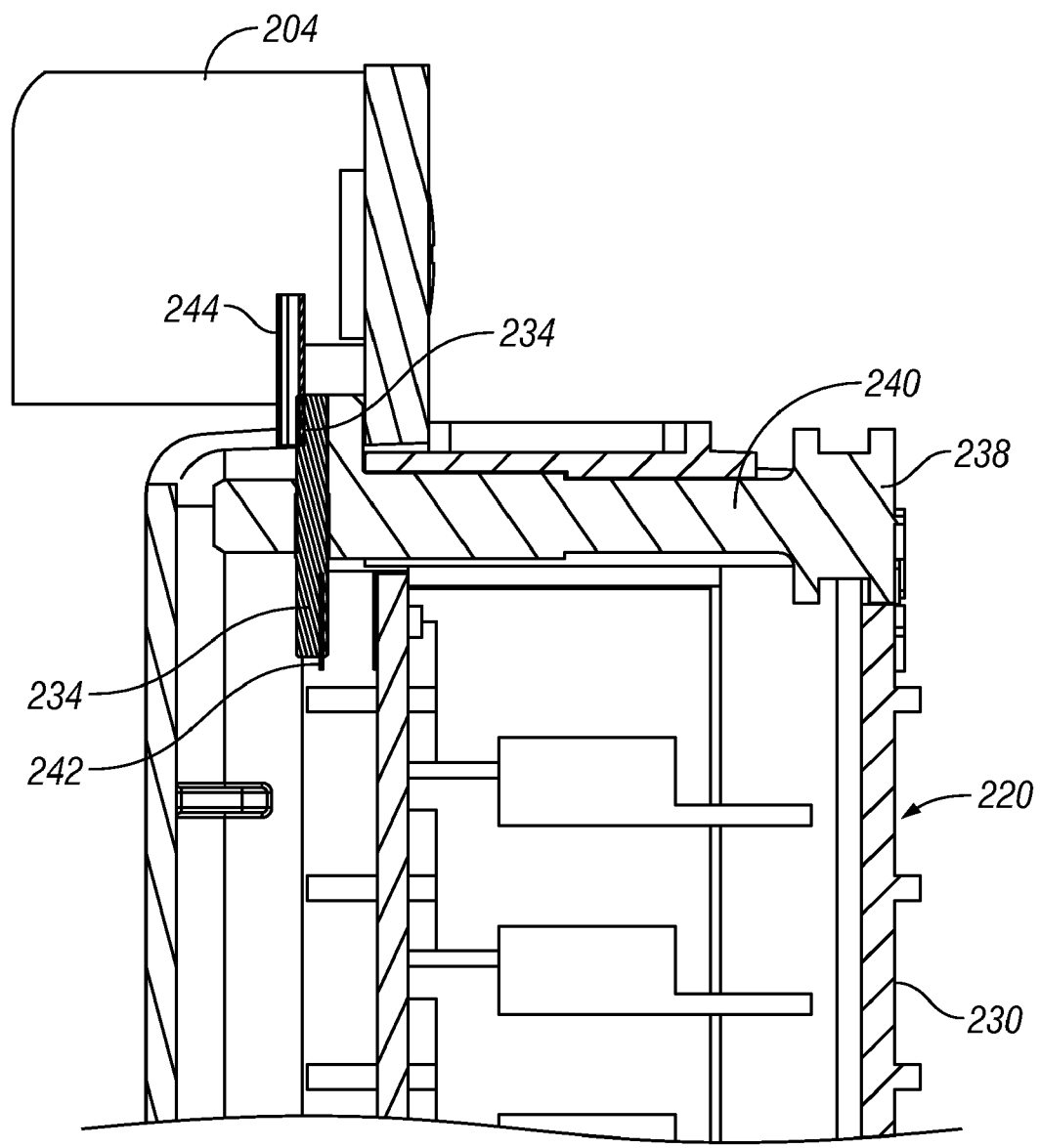
FIG. 24 is a view similar to FIG. 22 with the locking latch and power pin in their locked (power ON) positions.

FIGS. 15 and 16 illustrate a station module 220 designed for installation in the irrigation controller 200. The station module 220 includes a locking latch with a finger actuated lever 222 illustrated in unlocked and locked positions in FIGS. 15 and 16, respectively. The station module 220 includes a first set of electrical contacts in the form of a row of equally spaced conductive metal pins 224 (FIG. 17) that project from a bottom side of the station module 220. The pins 224 mate with a second set of electrical contacts in the form of a plurality of corresponding pin sockets in a female connector 226 (FIG. 14) forming part of a station module receptacle in the back panel 204. FIG. 14 illustrates a power module 220a and a station module 220b installed in side-by-side fashion in two adjacent station module receptacles located in the back panel 204. The modules 220a and 220b have screw terminals 228 located on their top sides for connecting the stripped ends of field valve lines (not illustrated) typically comprising twelve gauge wires.

Each station module, such as 220 (FIGS. 15 and 16) comprises an outer generally rectangular plastic housing 230 that encloses a small PC board 232 (FIG. 18) that supports a station module circuit. The station module circuit includes a micro-controller and triacs as well as conductive traces that lead to the screw terminals 228 and to the conductive pins 224. The pins 224 register with corresponding electrical contacts in the corresponding female connector 226 when the module 220 is inserted into its corresponding receptacle. The lever 222 must be in its unlocked position illustrated in FIG. 15 in order for the module 220 to be inserted into one of the receptacles, otherwise the outer end of a power pin 234 (FIG. 16) prevents insertion due to a lack of clearance relative to an adjacent vertical side wall 235 (FIGS. 19 and 20) of the receptacle. The module 220 and a large PC board 236 in the back panel 204 are thus electrically connected. When the module 220 is first plugged into a receptacle in the irrigation controller 200 a communication path is established between the micro-controller in the module 220 and the processor in the face pack 206 but the station module circuit does not have a power connection applied to the same at this time. The user may reduce the risk of damage to the electrical circuits by wiring all of the external connections before the source of power is connected to the station module circuits.

Referring to FIGS. 21-24, the locking latch 238 on each station module 220 includes a plastic shaft 240 with the lever 222 connected to the top end thereof. The shaft 240 is supported for rotation in bearings formed in a corner of the module housing 230. The power pin 234, which is made of a conductive metal, extends diametrically through the lower end of the shaft 234. When the lever 222 is rotated the power pin 234 moves from its unlocked position illustrated in FIGS. 19, 21 and 22 ninety degrees to its locked position illustrated in FIGS. 20, 23 and 24, the opposite ends of the power pin 234 engage with a power contact 242 in the station module 220 and a power contact 244 supported on the back panel 204. The power contacts 242 and 244 are preferably fabricated of suitable conductive sheet metal in the configuration of leaf springs to ensure that positive electrical connections are made. By way of example, the power contacts 242 and 244 may be made of spring steel with gold plated contact areas that resist corrosion. The power contact 244 is connected via wire 246 to a trace on the large PC board 236 that carries the power signal, which is typically twenty-four volts AC. When the power pin 234 is in its locked position it is engages and is snugly positioned against a shelf portion 248 (FIG. 23) of the back panel 204 and below the same to help hold the station module 220 in its receptacle.

Figure 25:
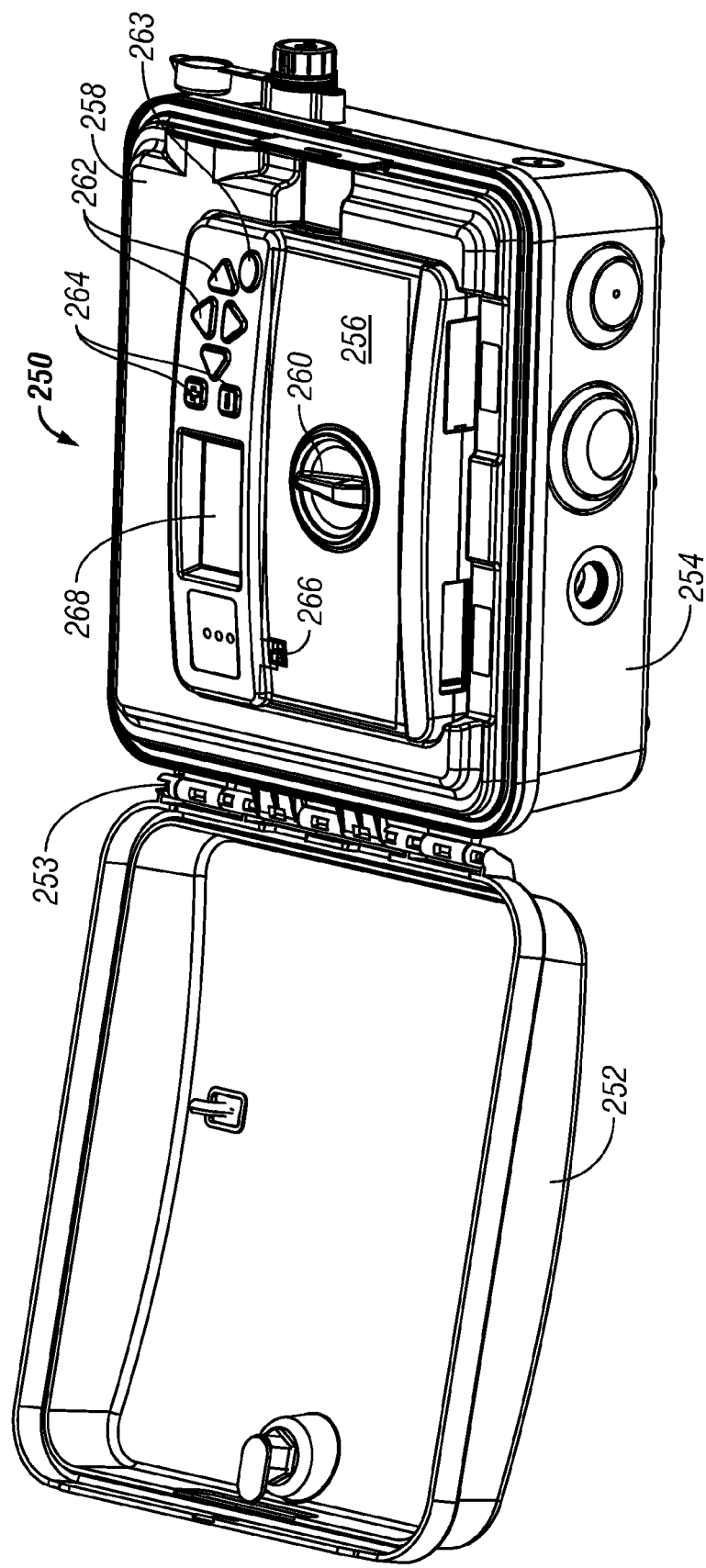
FIG. 25 is an isometric view of an irrigation controller in accordance with a third embodiment of the present invention with its front door open to reveal its removable face pack.
Figure 26:
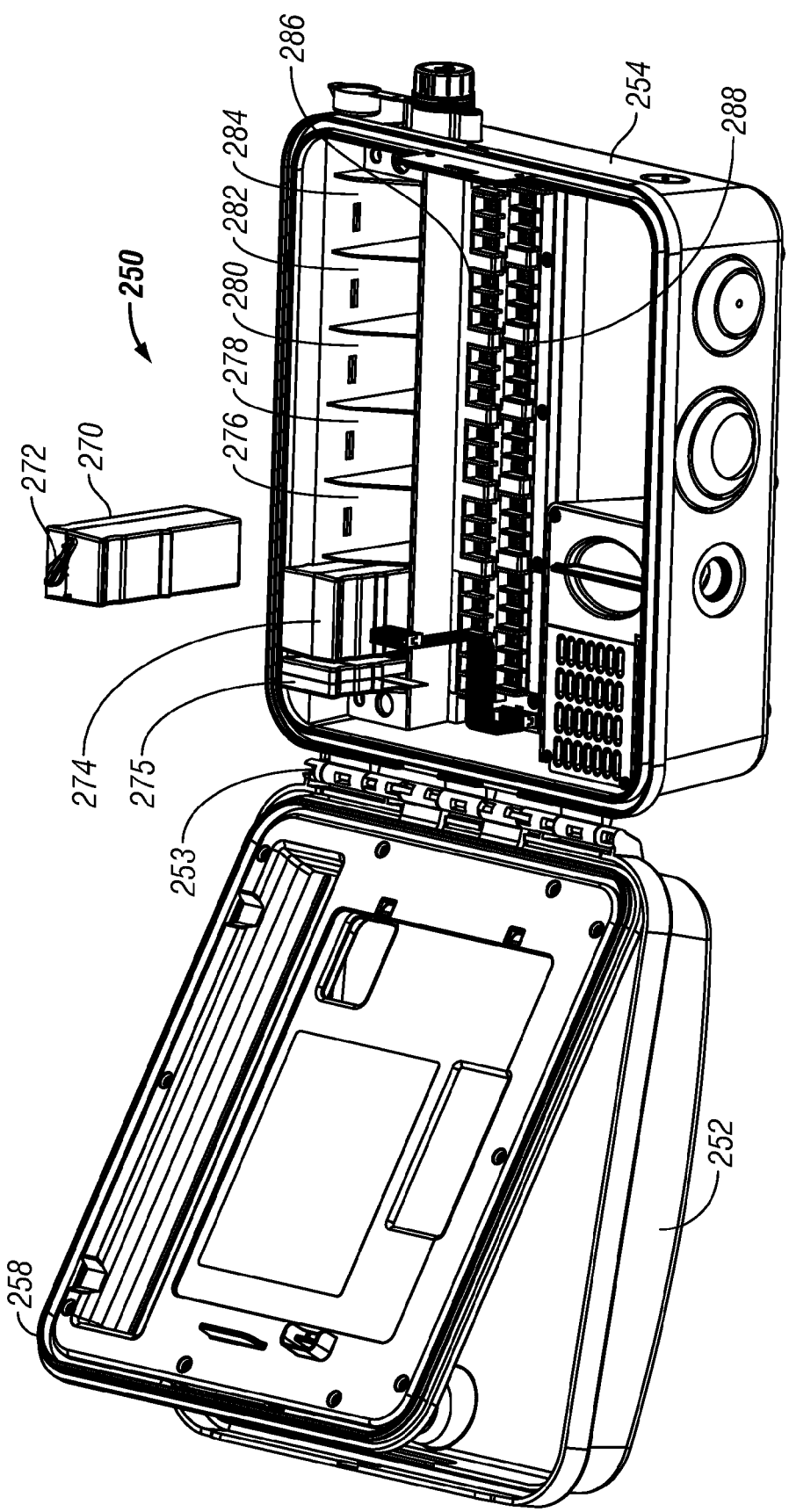
FIG. 26 is an isometric view of the irrigation controller of FIG. 13 with its face pack carrying frame swung open to reveal the module-receiving receptacles in its back panel.

FIGS. 25-38 illustrate a third embodiment 250 of the modular irrigation controller of the present invention. The irrigation controller 250 includes a wall-mountable plastic housing structure in the form of a generally box-shaped front door 252 (FIG. 25) connected via a dual hinge assembly 253 along one vertical edge to a generally box-shaped back panel 254 (FIG. 26). A generally rectangular face pack 256 (FIG. 25) is removably mounted in a rectangular frame 258. The frame 258 is also connected to the back panel 204 via the dual hinge assembly 253 for independent swinging motion between the door 252 and the back panel 254. The face pack 256 is normally concealed by the front door 252 when not being accessed for programming. The face pack 256 has a plurality of manually actuable controls including a rotary knob switch 260 and push button switches 262, 263 and 264 as well as slide switch 266. These manual controls can be manipulated in conjunction with numbers, words and/or graphic symbols indicated on a liquid crystal display (LCD) 268 for entering or selecting a watering program as is well known in the art of electronic irrigation controllers.

The face pack 256 (FIG. 25) encloses and supports a PC board (not illustrated) with a processor for handling solely the user interface. The processor in processor module 225 executes and implements a watering program stored in a memory in that module. An electrical connection is made between the face pack 256 and electrical components in the back panel 254 through a ribbon cable (not illustrated). The circuitry inside the face pack 256 can be powered by a battery to allow a person to remove the face pack 256, un-plug the ribbon cable, and walk around the lawn, garden or golf course while entering a watering program or altering a pre-existing watering program. This requires that processor module 225 be plugged directly into the face pack.

Figure 27:
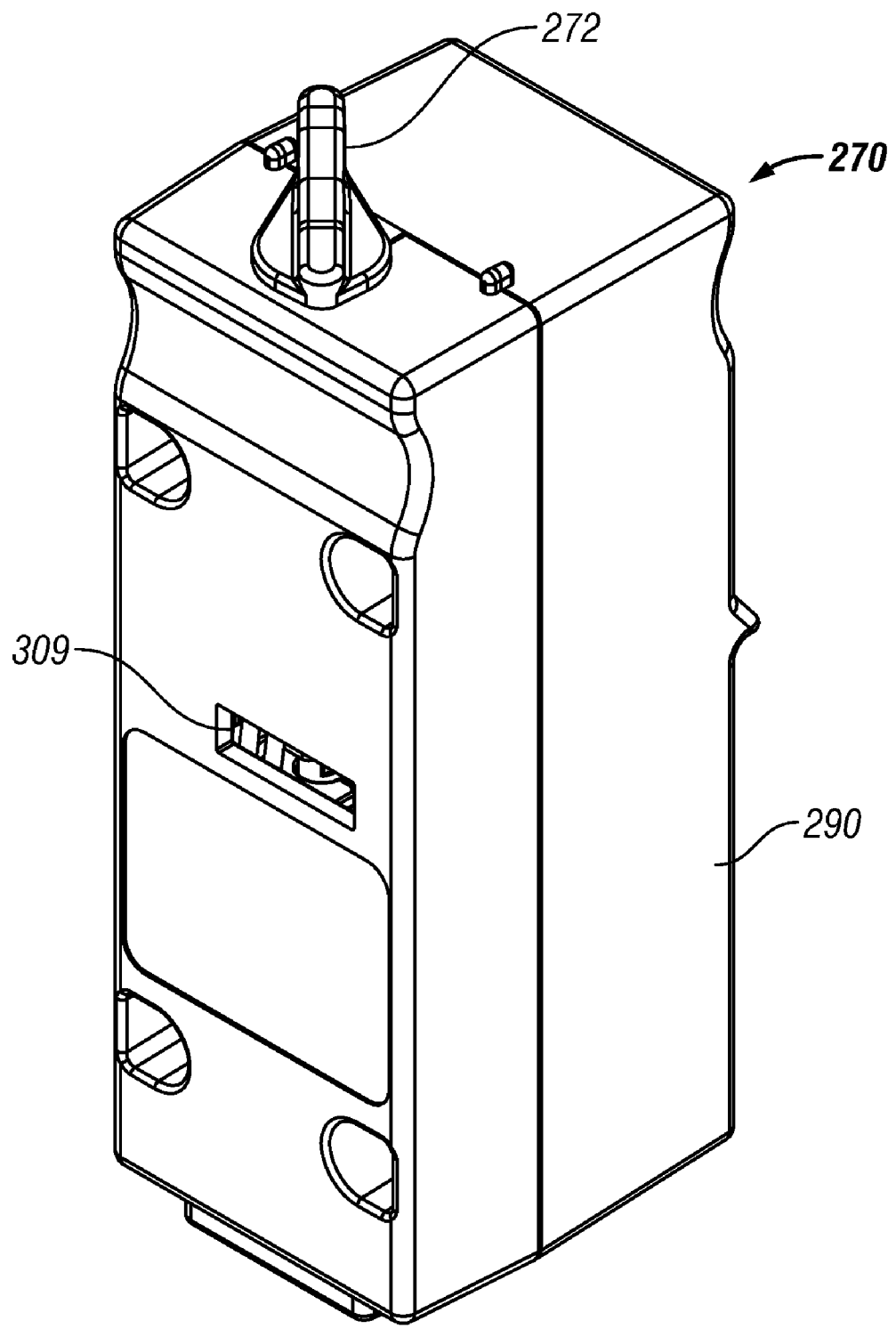
FIG. 27 is an enlarged isometric view of one of the station modules of the third embodiment with its locking latch in its unlocked (power OFF) position.
Figure 28:
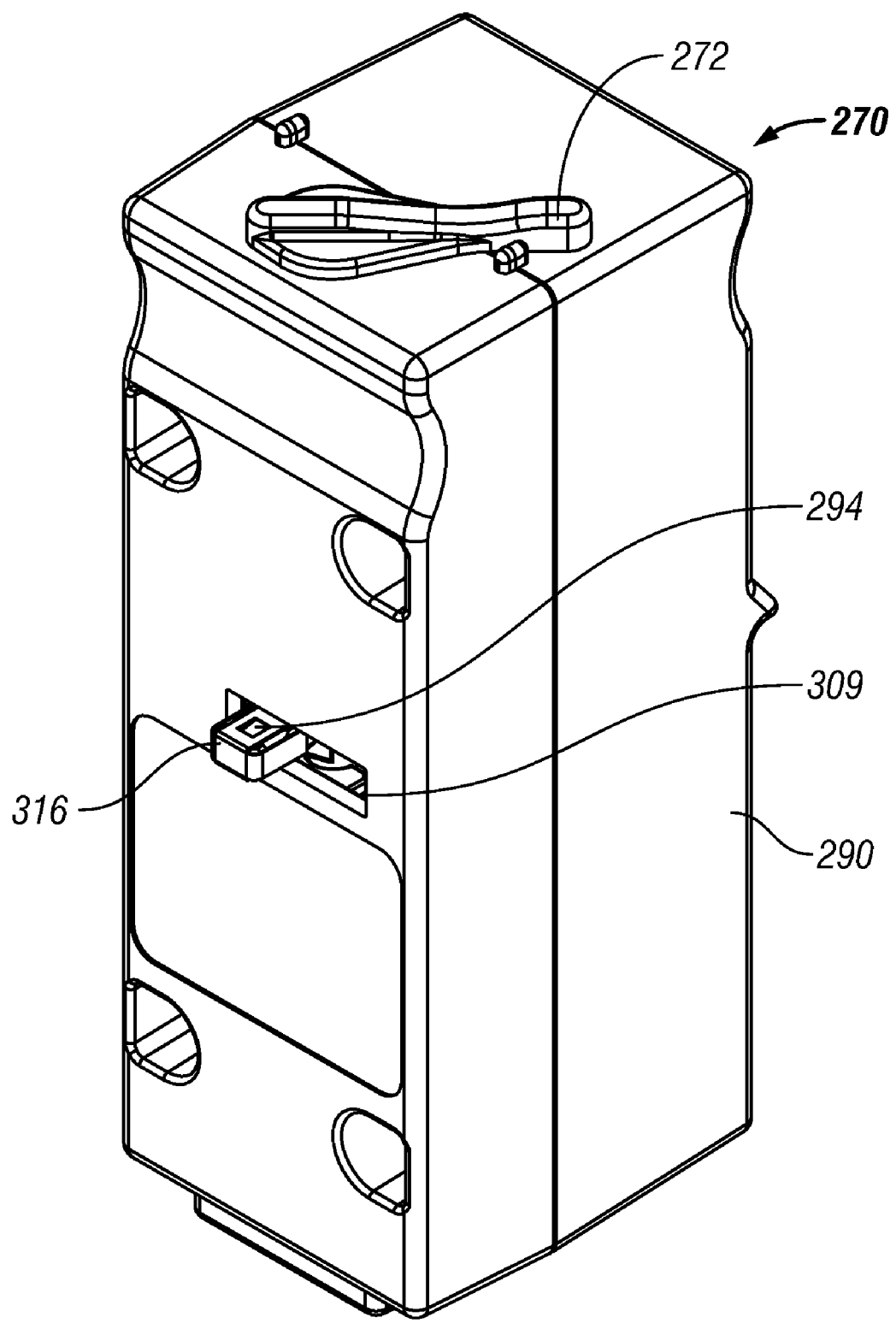
FIG. 28 is an enlarged isometric view of the station module of FIG. 27 with its locking latch in its locked (power ON) position.

FIGS. 27 and 28 illustrate a station module 270 designed for installation in the irrigation controller 250. The station module 270 includes a locking latch with a finger actuated lever 272 mounted on a top end thereof. The lever 272 is illustrated in unlocked and locked positions in FIGS. 27 and 28, respectively. The station module 270 includes a first set of electrical contacts in the form of a row of equally spaced conductive spring elements 273 (FIGS. 35 and 36) that are accessible through the bottom end of the station module 270. The spring elements 273a mate with a second set of electrical contacts in the form of a plurality of corresponding pins 273b that project upwardly from the bottom of each station module receptacle in the back panel 254. FIG. 26 illustrates a base module 274 installed in a suitably sized receptacle located in the back panel 254. FIG. 26 also illustrates the station module 270 about to be installed in a receptacle adjacent the base module 274. The base module 274 has extra circuitry for providing AC power and/or controlling a pump or other accessory.

A smaller receptacle in the back panel 254 receives the processor module 275 (FIG. 26) that contains a micro-microcontroller. The processor module 275 has multiple pins that mate with female electrical connector at the bottom of its smaller receptacle to thereby connect the circuitry in the processor module 275 to circuitry on the main PC board or "backplane" mounted in the back panel 254. The processor module 275 may have various processing capacities and/or programming to allow the same basic irrigation controller to be offered with different levels of features and capabilities simply by plugging in different processor module 275. The back panel 254 has additional receptacles 276, 278, 280, 282 and 284 for receiving additional modules such as station controlling modules or "smart" modules for handling the processing of sensor data, for example. Two separate terminal strips 286 and 288 are provided in the back panel 254 and are electrically connected to the modules through the main PC board mounted in the back panel 254. The terminal strips 286 and 288 have a plurality of individual screw terminals for connecting the stripped ends of field valve lines (not illustrated) typically comprising twelve gauge wires.

Each station module, such as 270 (FIGS. 27 and 28) comprises an outer generally rectangular, elongated plastic housing 290 that encloses a small PC board 292 (FIGS. 30 and 31) that supports a station module circuit. The station module circuit includes a micro-controller and triacs as well as conductive traces that lead to the to the conductive pins. The pins register with corresponding electrical contacts in the corresponding female connector at the bottom of the corresponding station module receptacle when the station module 270 is inserted into its corresponding receptacle.

The lever 272 must be in its unlocked position illustrated in FIG. 27 in order for the module 270 to be inserted into one of the receptacles, otherwise the outer end of a power pin 294 (FIGS. 28 and 29) prevents insertion due to a lack of clearance relative to an adjacent vertical side wall 296 (FIGS. 35 and 36) of the receptacle. The station module 270 and a large PC board 320 in the back panel 254 are thus electrically connected. When the module 270 is first plugged into a receptacle in the irrigation controller 250 a communication path is established between the micro-controller in the module 270 and the processor in the face pack 256 but the station module circuit does not have a power connection applied to the same at this time.

Figure 29:
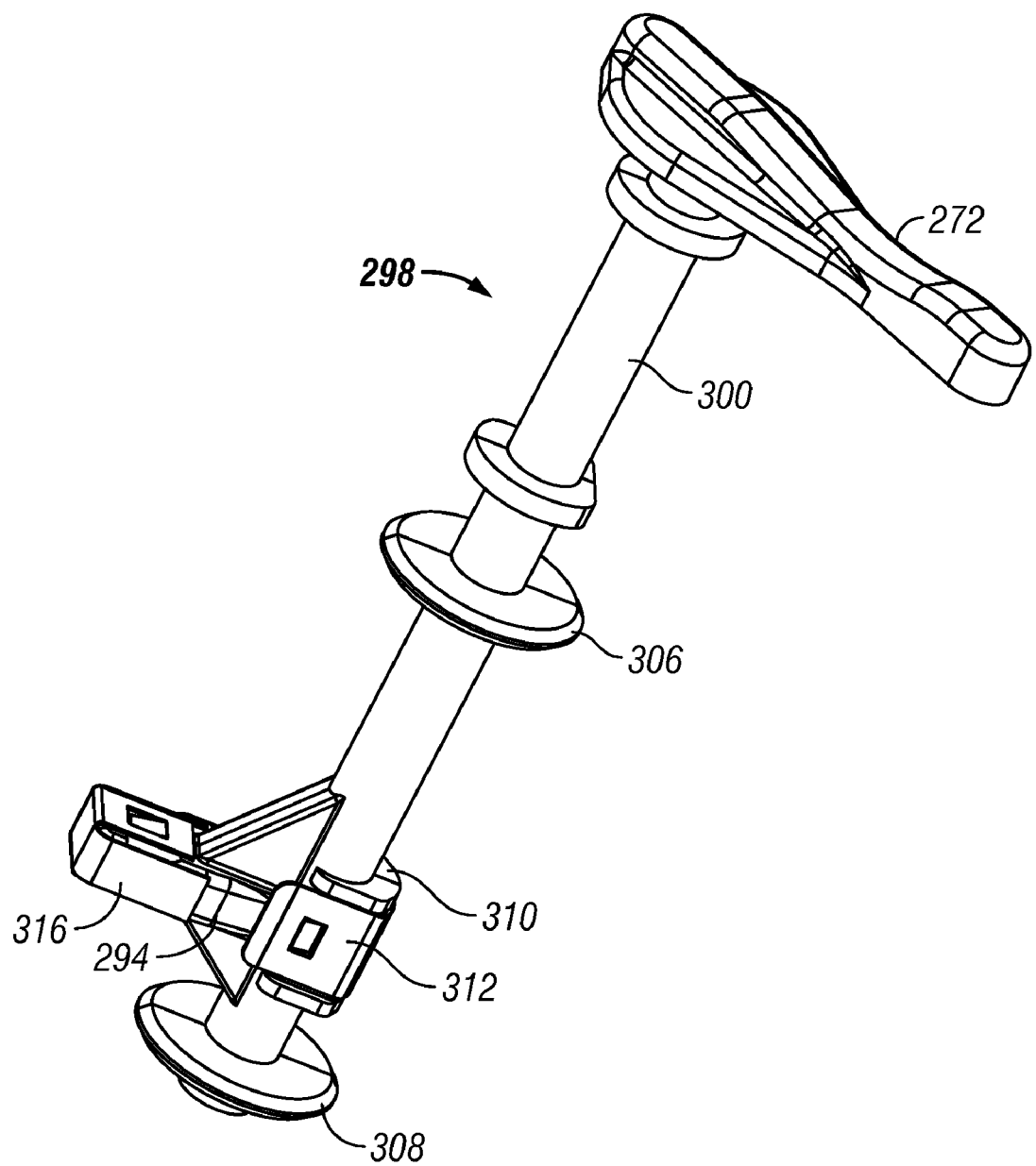
FIG. 29 is an enlarged isometric view of the locking latch of the station module of FIGS. 27 and 28.
Figure 30:
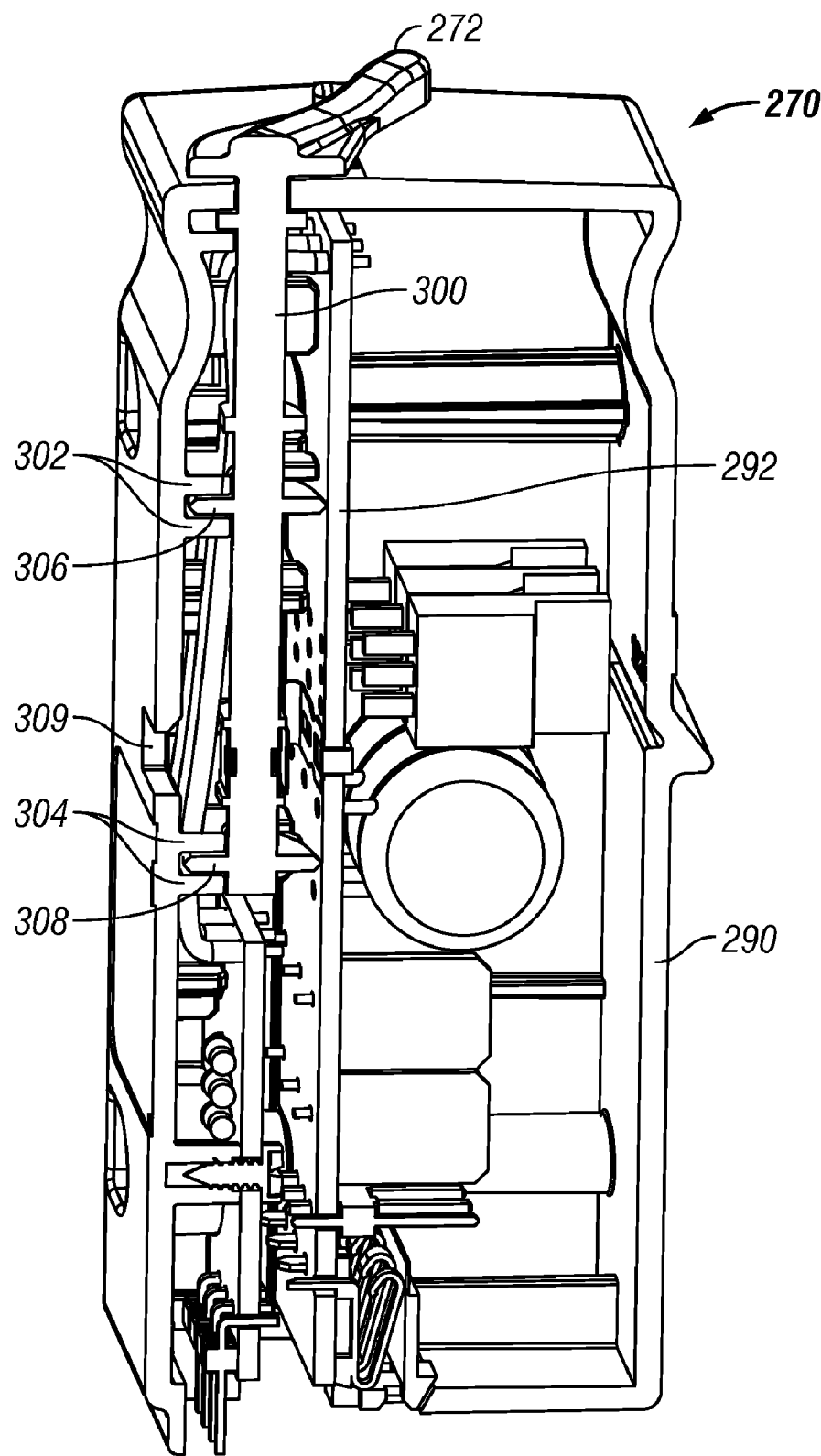
FIG. 30 is an enlarged vertical sectional view of the station modules of FIGS. 27 and 28 with its locking latch in its unlocked (power OFF) position.
Figure 31:
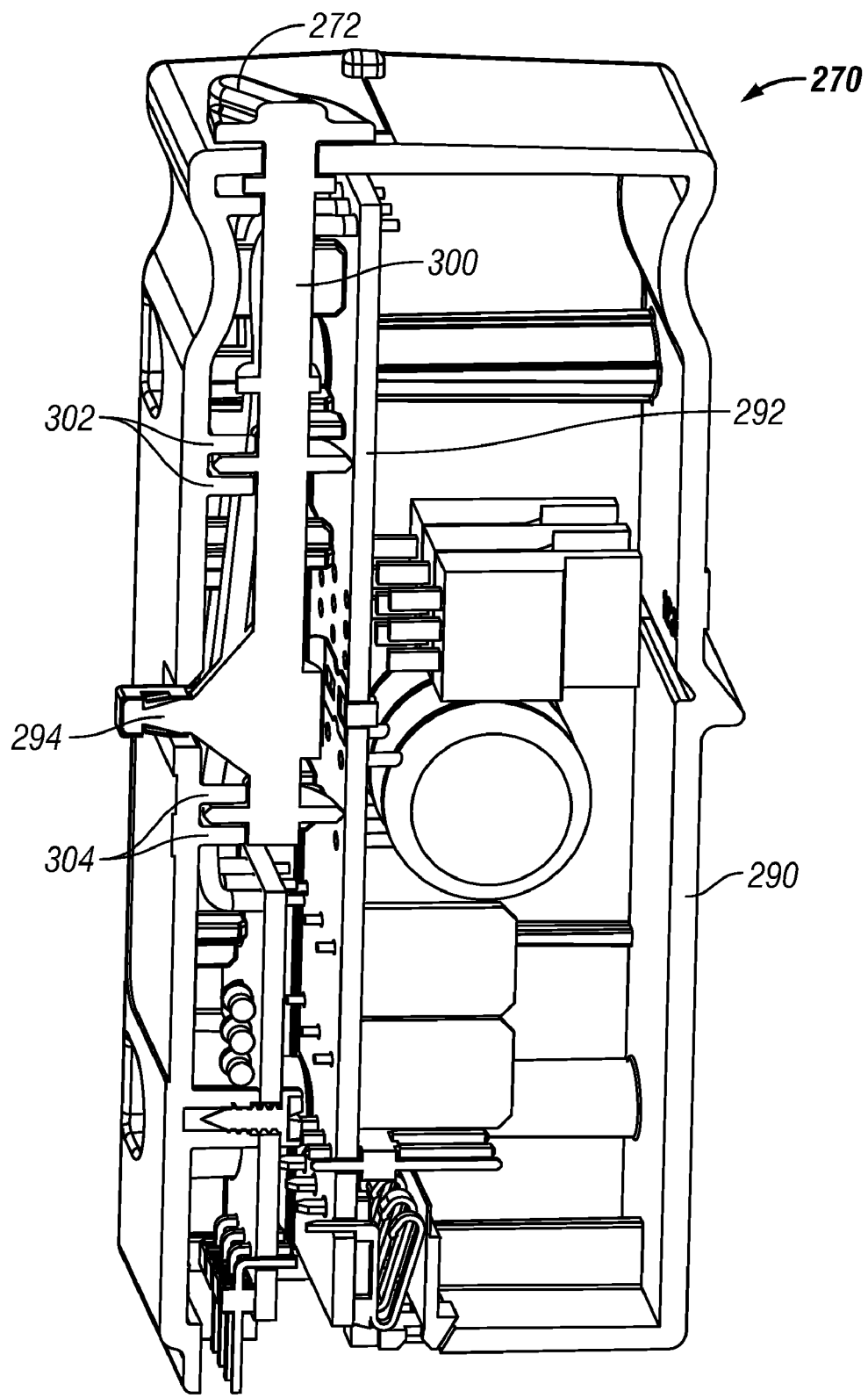
FIG. 31 is an enlarged vertical sectional view of the station module of FIGS. 27 and 28 with its locking latch in its locked (power ON) position.
Figure 32:
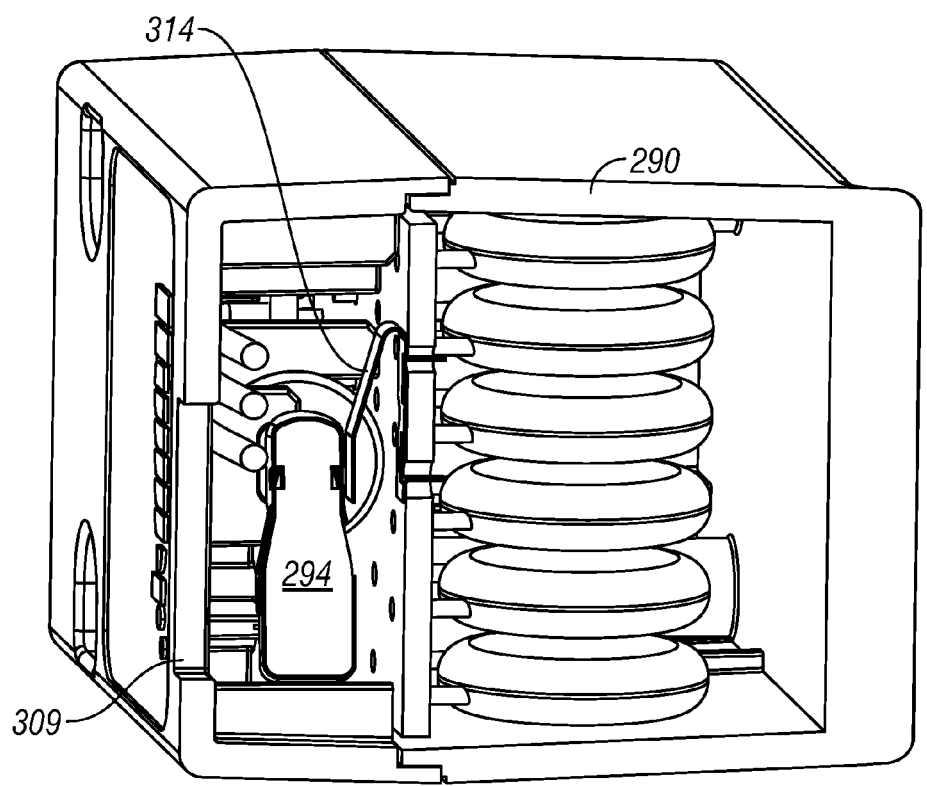
FIG. 32 is an enlarged cross-sectional view of the station modules of FIGS. 27 and 28 with its locking latch in its unlocked (power OFF) position.
Figure 33:
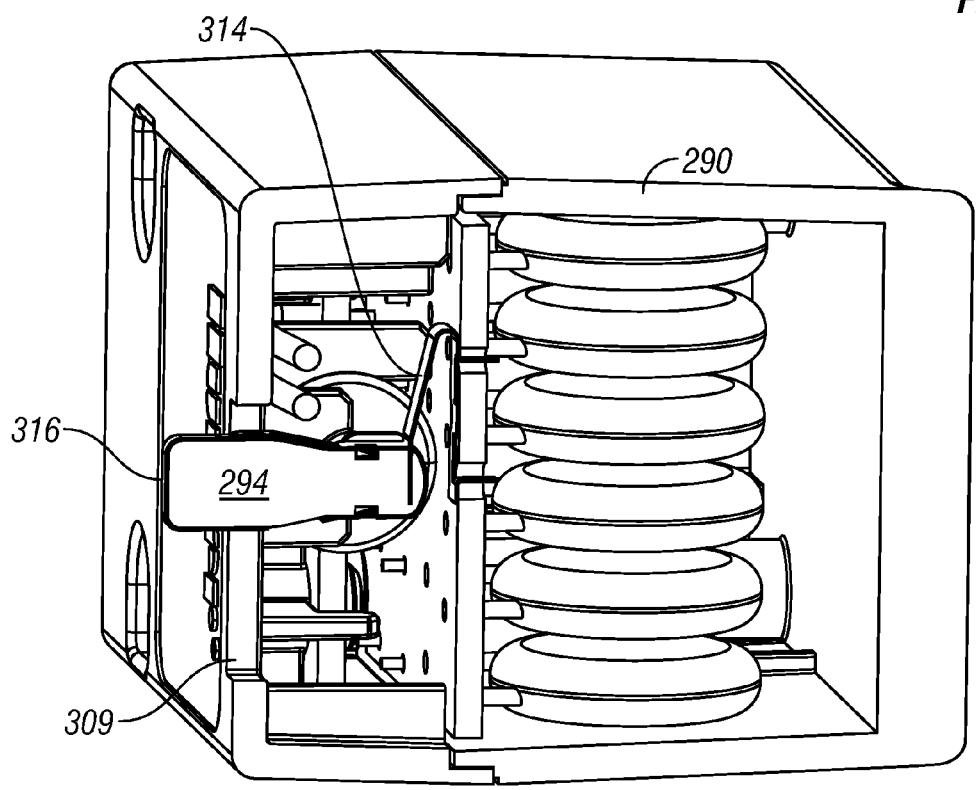
FIG. 33 is an enlarged cross-sectional view of the station module of FIGS. 27 and 28 with its locking latch in its locked (power ON) position.
Figure 34:
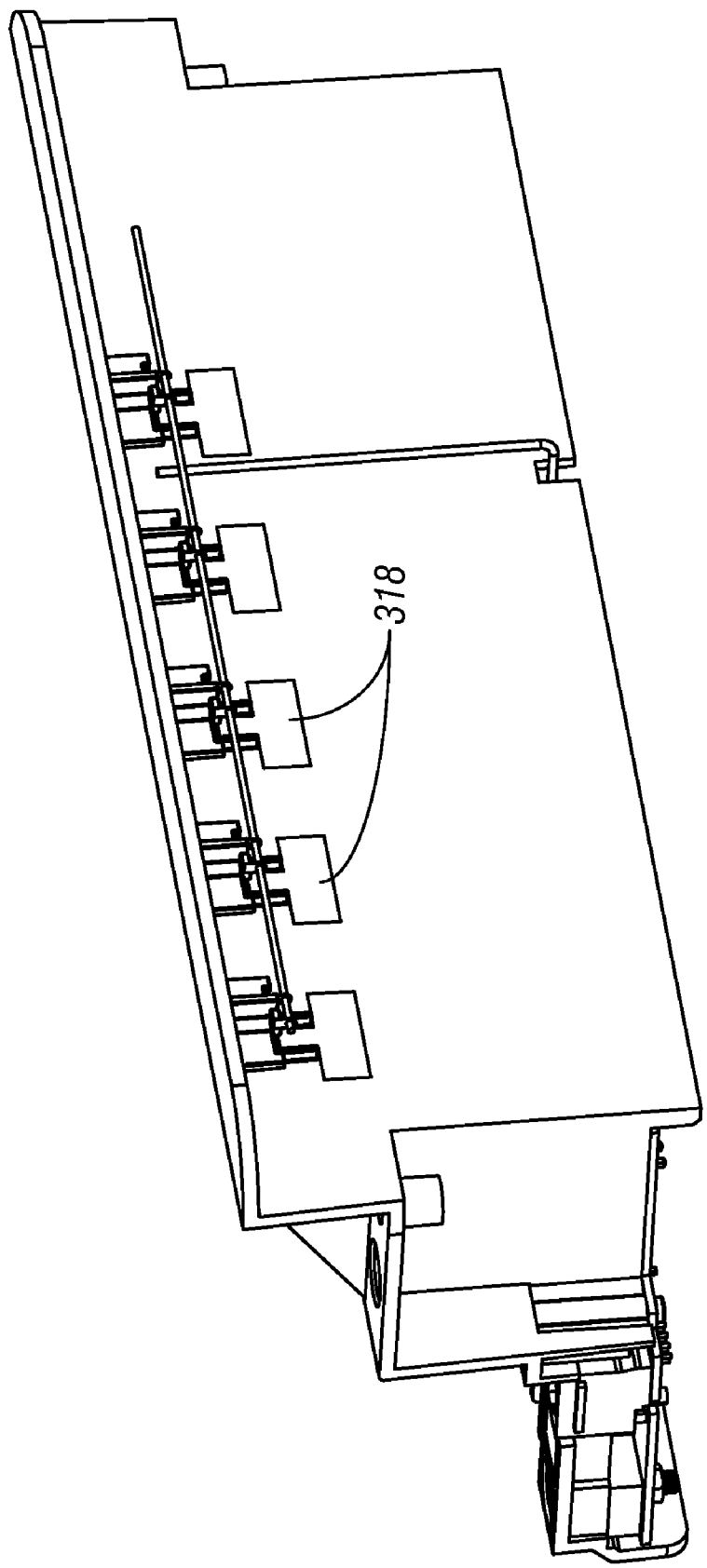
FIG. 34 is a fragmentary view of a portion of the back panel of the third embodiment illustrating its backplane electrical contacts.
Figure 35:
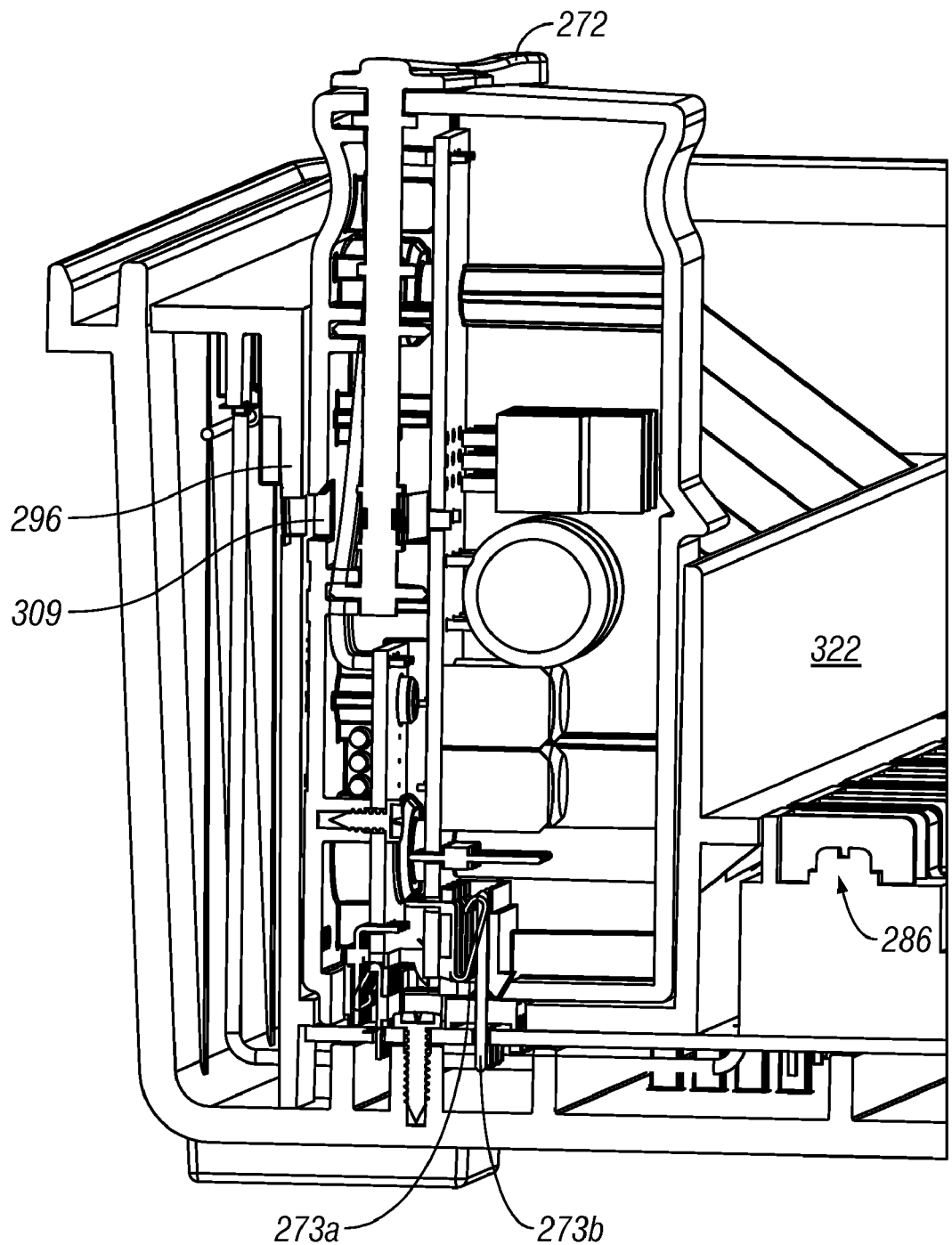
FIGS. 35 and 36 are enlarged, fragmentary, vertical sectional views of a portion of the third embodiment of the irrigation controller illustrating a station module installed with its locking latch in its unlocked (power OFF) and locked (power ON) positions, respectively.
Figure 36:
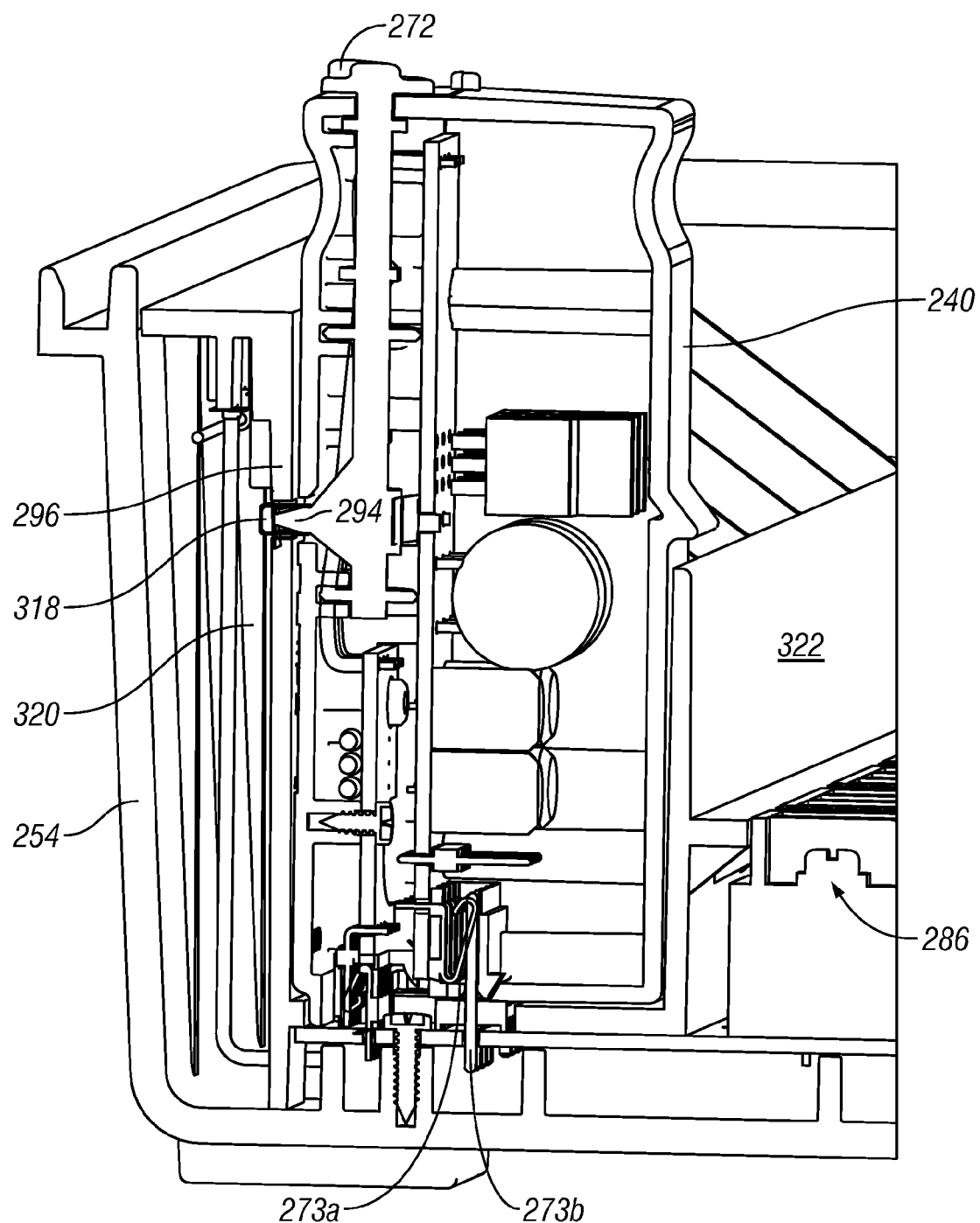
Figure 37:
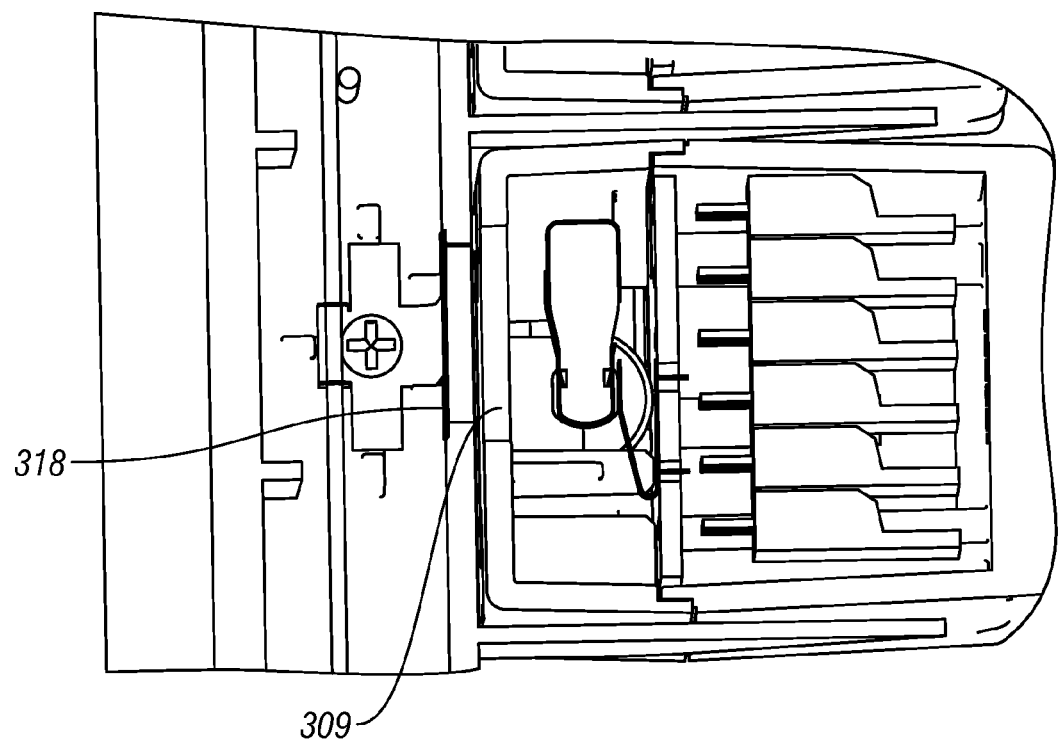
FIGS. 37 and 38 are enlarged, fragmentary, cross-sectional views of a portion of the third embodiment of the irrigation controller illustrating a station module installed with its locking latch in its unlocked (power OFF) and locked (power ON) positions, respectively.
Figure 38:
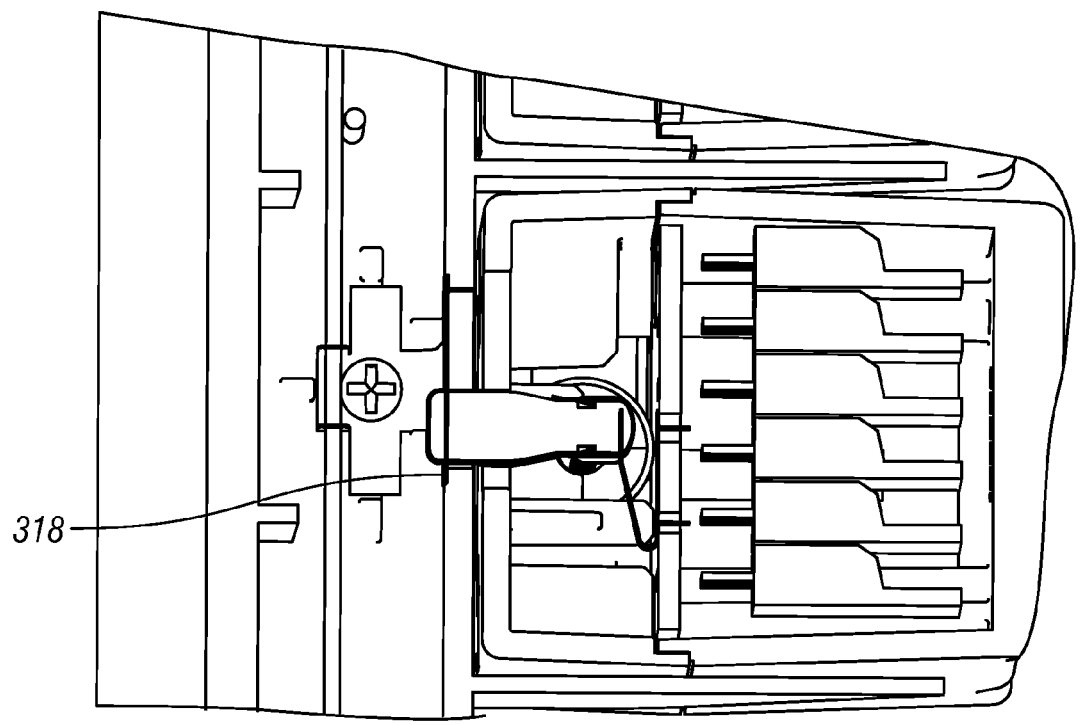

Referring to FIG. 29, the locking latch 298 on each station module 270 includes a plastic shaft 300 with the lever 272 connected to the top end thereof. The shaft 300 is supported for rotation in upper and lower plastic bearing pairs 302 and 304 (FIGS. 30 and 31) formed in a the module housing 290. Upper and lower discs 306 and 308 (FIG. 29) formed on the shaft 300 rotate in the bearing pairs 302 and 304, respectively. The power pin 294 (FIG. 29), which is made of plastic, extends orthogonally from the lower end of the shaft 300. When the lever 272 is rotated to rotate the power pin 294 moves from its unlocked position illustrated in FIG. 32 ninety degrees to its locked position illustrated in FIG. 33. The power pin 294 protrudes through a slot 309 (FIGS. 28, 35 and 37) rectangular housing 290 of the station module 270. The shaft 300 has a shoulder 310 (FIG. 29) formed on its lower end that extends outwardly opposite the power pin 294. The shoulder 294 is encased in a wrap-around gold-plated metal contact 312 that engages with a power contact 314 (FIG. 32) in the station module 270. The outer end of the power pin 294 is encased with another wrap-around gold-plated metal contact 316 that engages with a power contact 318 (FIGS. 34 and 36) connected main PC board 320 mounted in the back panel 254. The power contacts 314 may be made of spring steel with a gold plated contact area that resists corrosion. The power contacts 318 are connected to a trace on the large PC board 320 that carries the power signal, which is typically twenty-four volts AC. When the power pin 294 is in its locked position it mechanically locks the station module 270 in its receptacle since the power pin 294 cannot clear the vertical side wall 296 if a user attempts to pull the station module 270 vertically out of its receptacle in the back panel 254. Common vertical wall 322 (FIGS. 26, 35 and 36) that partially defines the bay of module receptacles prevents the inserted station module 270 from being pushed rearwardly when the power pin 294 engages the power contact 318.

While exemplary embodiments of a modular irrigation controller with indirectly powered station modules have been described in detail, it will be apparent to those skilled in the art that the invention can be carried out in other arrangements. As an example, the irrigation controller 10 could be designed to control a predetermined number of valves, e.g. four, without requiring the insertion of any station modules. As another example, other module locking means can be utilized such as those disclosed and illustrated in the aforementioned co-pending U.S. patent application Ser. No. 11/251,690 filed Oct. 17, 2005. These include individual slide locks on the modules, a single locking lever on the controller housing for locking all of the modules in place simultaneously, bayonet locking mechanisms, rotary locking mechanisms, screw locking mechanisms, cam locking mechanisms, fork locking mechanisms, over-center latch lock mechanisms, and push-pull lock mechanisms.

Persons skilled in the art will readily understand how to route twenty-four volt AC power through these various locking means to the individual station modules such that the AC power will only be supplied to the station modules when the station modules are locked in place in their respective receptacles. A mechanism could be manually actuated to apply a power connection to a module or to all the modules, which power connection may or may not be live. If the power connection is not live, it could be made live by other switch mechanisms. As yet another example, the station modules could be inserted into their receptacles, and without locking the modules in place, a push button could be actuated to apply the twenty four volt AC power signal to the station modules. As another example, the irrigation controller 10 can be modified to function as a hybrid modular/decoder controller as disclosed in the aforementioned U.S. Pat. No. 7,069,115. The communication between the station modules and the processor can be accomplished through direct physical electrical connection that establishes conductive paths, or the communication can be established through optical or wireless means. The electro-optic isolators 108 (FIG. 3) are not essential but do help protect the processor 102. Other receptacle constructions, and various processor-module communication schemes, are disclosed in various ones of the issued patents and pending applications incorporated by reference herein.

In addition to providing a novel modular expandable irrigation controller, those skilled in the art of irrigation controllers will appreciate that we have also provided a novel method of increasing the number of zones of an irrigation a controller. In one embodiment, this method includes the steps of providing a modular expandable irrigation controller and then plugging at least one station module into the irrigation controller to establish a communication path between the station module and a processor in the controller. This method further includes the step of manually actuating a mechanism to apply a power connection to the station module. We have also provided a novel method of connecting a power signal to the station modules of a modular expandable irrigation controller. In one embodiment, this method includes the steps of providing a modular expandable irrigation controller and plugging at least one station module into the irrigation controller. This method further includes the steps of establishing a communication path between the station module and a processor in the controller through a first set of electrical contacts on a first side of the station module, and connecting a power signal to the station module through second set of electrical contacts located on second side of the station module.

Therefore, the protection afforded the present invention should only be limited in accordance with the following claims.

What is claimed is:

1. An irrigation controller, comprising:
   a processor for executing a watering program and turning a plurality of irrigation valves ON and OFF in accordance with the watering program;
   at least one station module including a station module circuit connectable to at least one of the irrigation valves;
   at least one receptacle that establishes a communication path between the processor and the station module circuit when the station module is inserted into the receptacle; and
   a manually actuable mechanism that allows a power connection to be applied to the station module circuit after the station module has been inserted into the receptacle and the communication path has been established.

2. The controller of claim 1 wherein the station module has a first set of electrical contacts and the receptacle has a second set of electrical contacts which mate with the first set of electrical contacts to establish the communication path.

3. The controller of claim 2 wherein a power signal is applied to the station module circuit through a separate electrical contact located on the station module remote from the first and second sets of mating electrical contacts.

4. The controller of claim 1 wherein the manually actuable mechanism includes a sliding lock.

5. The controller of claim 1 wherein the manually actuable mechanism includes a rotating locking latch.

6. The controller of claim 1 wherein the receptacles are defined by a bay with side walls.

7. The controller of claim 1 wherein the station module includes a lower piece and an upper cover piece.

8. The controller of claim 1 wherein the processor and the station module circuit communicate through a bus.

9. The controller of claim 5 wherein the locking latch carries a power pin that can be rotated with the locking latch to apply the power connection.

10. The controller of claim 2 wherein the first and second set of mating electrical contacts include a plurality of pins and a plurality of corresponding pin sockets.

11. A modular irrigation controller with indirectly powered station modules, comprising:
    means for entry or selection of a watering program;
    memory means for storing the watering program;
    at least one station module including a station module circuit for switching a source of electrical power to open and close a valve;
    processor means connectable to the station module circuit and capable of executing the watering program and sending commands to the station module circuit to open and close the valve in accordance with the watering program;
    receptacle means for removably receiving the station module and establishing a communication path between the processor means and the station module circuit when the station module is inserted into the receptacle means; and
    means for substantially simultaneously locking the station module in the receptacle means and establishing a power connection to the station module circuit after the communication path has been established.

12. The controller of claim 11 wherein the communication path is established through a first set of electrical contacts located in a first side of the station module and the power connection is established through a second set of electrical contacts located in a second side of the station module.

13. The controller of claim 11 wherein the locking means includes a single locking bar that can be moved to lock the station module in the receptacle and establish the power connection.

14. The controller of claim 13 wherein a portion of the second set of electrical contacts is mounted on the locking bar.

15. The controller of claim 11 wherein each station module includes a micro-controller and at least one switching device.

16. The controller of claim 11 wherein the locking means includes a rotatable lever.

17. The controller of claim 11 wherein the receptacle means are located in a back panel.

18. The controller of claim 17 wherein the receptacle means are partially defined by side walls that project from the back panel.

19. The controller of claim 14 wherein a conductor beneath the locking bar connects a source of electrical power to the portion of the second set of electrical contacts mounted on the locking bar.

20. An irrigation controller, comprising:
    means for entry or selection of a watering program;
    a memory capable of storing the watering program;
    a plurality of station modules, each including a station module circuit, for switching a source of electrical power to open and close a plurality of irrigation valves;
    a plurality of receptacles for removably receiving the station modules;
    a processor connectable to each station module circuit through a first set of electrical contacts when the station modules are inserted into the receptacles to thereby establish a communication path between the processor and the station module circuits, the processor being capable of executing the watering program and sending commands to the station module circuits to open and close the irrigation valves in accordance with the watering program; and
    a mechanism for connecting the source of electrical power to each station module circuit through a second set of electrical contacts after the communication path has been established;
    whereby a user may reduce the risk of damage to the electrical circuits by wiring all of the external connections before the source of electrical power is connected to the station module circuits.

* * * * *